United States Patent
Oyama

(10) Patent No.: US 10,841,035 B2
(45) Date of Patent: Nov. 17, 2020

(54) TRANSMISSION DEVICE, CONTROL DEVICE, AND TRANSMISSION METHOD

(71) Applicant: FUJITSU LIMITED, Kawasaki (JP)

(72) Inventor: Tomofumi Oyama, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 16/733,789

(22) Filed: Jan. 3, 2020

(65) Prior Publication Data

US 2020/0228228 A1    Jul. 16, 2020

(30) Foreign Application Priority Data

Jan. 11, 2019    (JP) .................................. 2019-003761

(51) Int. Cl.
*H04J 14/02* (2006.01)
*H04L 25/49* (2006.01)
*H04L 7/033* (2006.01)

(52) U.S. Cl.
CPC ...... *H04J 14/0257* (2013.01); *H04J 14/0224* (2013.01); *H04J 14/0267* (2013.01);
(Continued)

(58) Field of Classification Search
CPC .... H04J 14/02; H04J 14/0267; H04J 14/0227; H04J 14/0257; H04J 14/0224; H04J 14/04; H04B 10/07953; H04B 10/572; H04B 10/2507; H04B 10/564; H04B 10/5057; H04B 10/40; H04B 10/0795; H04B 10/671; H04N 10/2581; H04Q 11/0066; H04Q 11/0003; H04Q 11/0005; H04Q 11/0062
(Continued)

(56) References Cited

U.S. PATENT DOCUMENTS

| | | | |
|---|---|---|---|
| 5,991,477 A | 11/1999 | Ishikawa et al. | |
| 6,934,479 B2* | 8/2005 | Sakamoto | H04B 10/0775 398/193 |

(Continued)

FOREIGN PATENT DOCUMENTS

| | | |
|---|---|---|
| JP | 2005-229653 | 8/2005 |
| JP | 2012-124934 | 6/2012 |

OTHER PUBLICATIONS

K. Shibahara et al., "Space-Time Coding-Assisted Transmission for Mitigation of MDL Impact on Mode-Division Multiplexed Signals", OFC 2016, Th4C.4.pdf., Optical Society of America.

*Primary Examiner* — Hanh Phan
(74) *Attorney, Agent, or Firm* — Fujitsu Patent Center

(57) ABSTRACT

A transmission device includes a first signal processing circuit configured to average transmission quality of a first data signal based on a third data signal, a second signal processing circuit configured to average transmission quality of a second data signal based on a fourth data signal; and a processor configured to allocate a channel in a transmission path that transmits the first data signal and a channel in a transmission path that transmits the second data signal, based on a first index value indicating transmission quality of a first optical signal in the transmission path, the first optical signal being generated based on the averaged first data signal and a second index value indicating transmission quality of a second optical signal in the transmission path, the second optical signal being generated based on the averaged second data signal.

14 Claims, 23 Drawing Sheets

(52) U.S. Cl.
CPC ...... *H04L 25/4904* (2013.01); *H04L 25/4919* (2013.01); *H04L 7/033* (2013.01)

(58) Field of Classification Search
USPC ......... 398/79, 193, 194, 195, 196, 197, 199, 398/135, 136, 137, 138, 139, 159, 162, 398/33, 38, 26, 27, 95, 183, 188, 202, 398/208, 209, 147
See application file for complete search history.

(56) References Cited

U.S. PATENT DOCUMENTS

| | | | |
|---|---|---|---|
| 7,280,768 B2 * | 10/2007 | Zaacks | H04B 10/07953 398/159 |
| 2009/0087194 A1 | 4/2009 | Nakashima et al. | |
| 2016/0197679 A1 * | 7/2016 | Tanaka | H04B 10/572 398/79 |

* cited by examiner

| SIGNAL ID | CH-ID | WAVELENGTH | SNR(dB) | RECEPTION SIDE CONSTELLATION |
|---|---|---|---|---|
| #1 | #1 | λ1 | 14.0 | |
| #2 | #2 | λ2 | 11.2 | |
| #3 | #3 | λ3 | 6.9 | |
| #4 | #4 | λ4 | 5.4 | |

Gb

| SIGNAL ID | CH-ID | WAVELENGTH | SNR(dB) | RECEPTION SIDE CONSTELLATION |
|---|---|---|---|---|
| #1 | #1 | λ1 | 7.4 | |
| #2 | #4 | λ4 | 7.4 | |
| #3 | #3 | λ3 | 6.4 | |
| #4 | #2 | λ2 | 6.4 | |

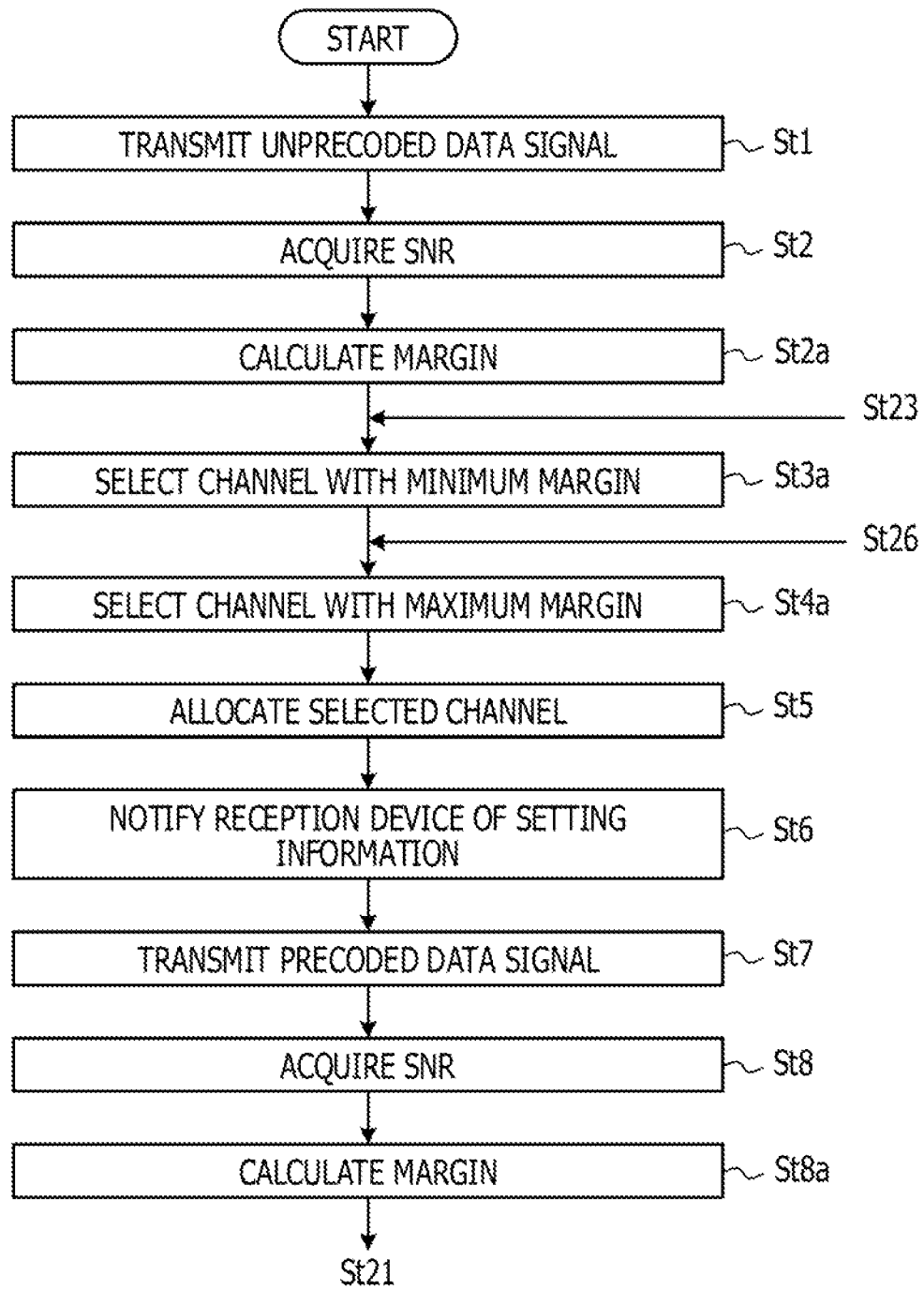

| SIGNAL ID | CH-ID | WAVELENGTH | SNR(dB) | SNR MARGIN (dB) | RECEPTION SIDE CONSTELLATION |
|---|---|---|---|---|---|
| #1 | #1 | λ1 | 14.0 | +7.0 | |
| #2 | #2 | λ2 | 11.2 | +4.2 | |
| #3 | #3 | λ3 | 6.9 | −0.1 | |
| #4 | #4 | λ4 | 5.4 | −1.6 | |

↓

Gd ↙

| SIGNAL ID | CH-ID | WAVELENGTH | SNR(dB) | SNR MARGIN (dB) | RECEPTION SIDE CONSTELLATION |
|---|---|---|---|---|---|
| #1 | #1 | λ1 | 7.4 | +0.4 | |
| #2 | #4 | λ4 | 7.4 | +0.4 | |
| #3 | #3 | λ3 | 8.4 | +1.4 | |
| #4 | #2 | λ2 | 8.4 | +1.4 | |

FIG. 13
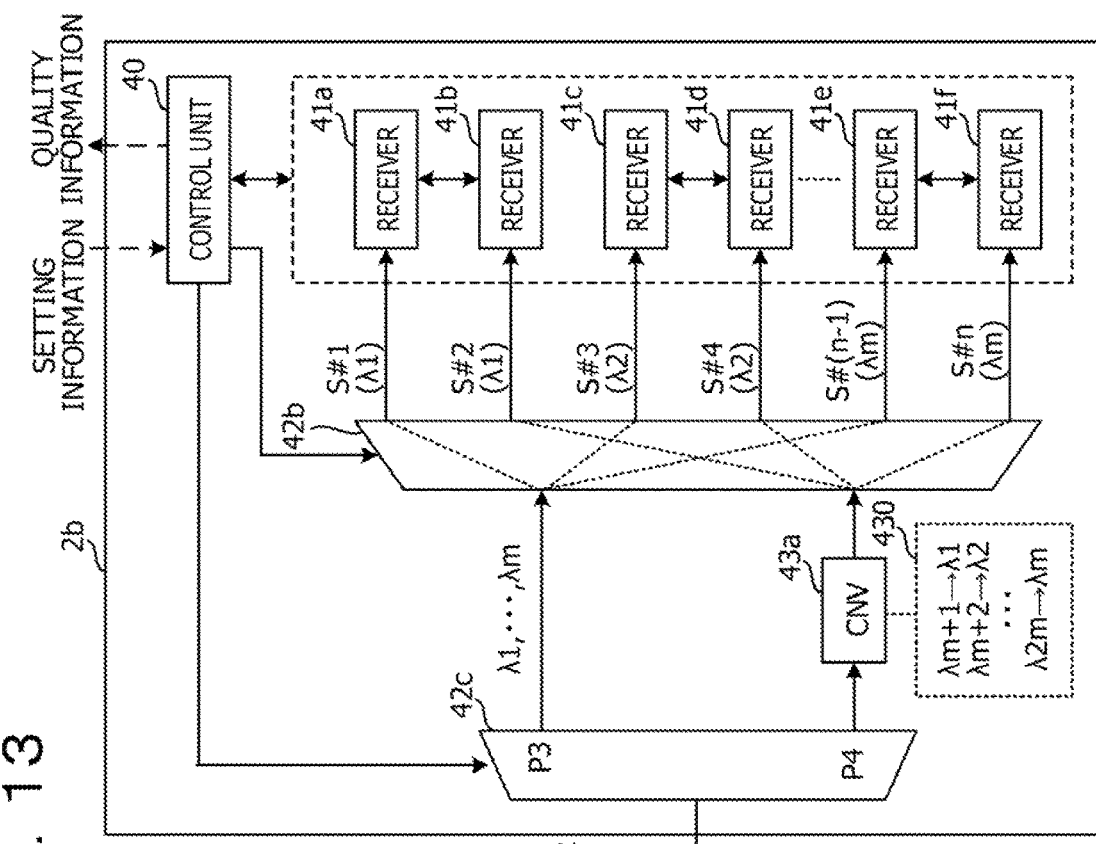
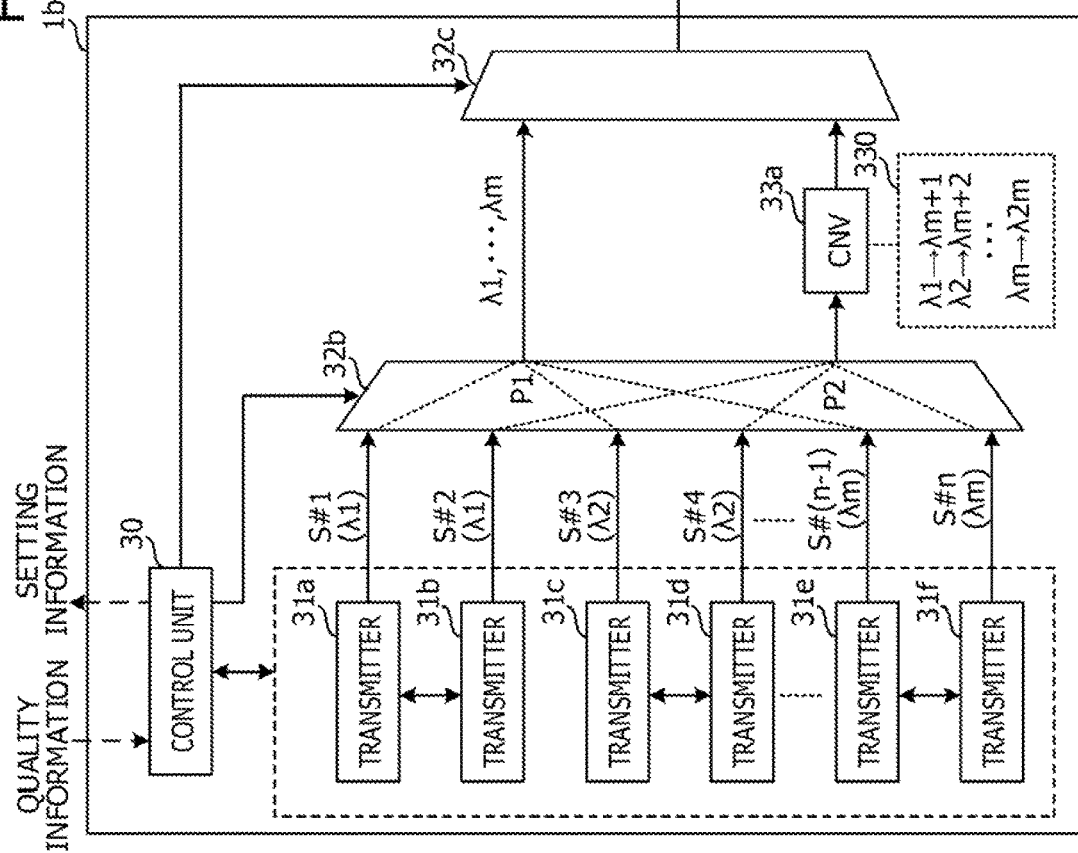

| SIGNAL ID | CH-ID | PORT ID | SNR(dB) |
|---|---|---|---|
| #1 | #1 | P5 | 14.0 |
| #2 | #2 | P6 | 11.2 |
| #3 | #3 | P7 | 6.9 |
| #4 | #4 | P8 | 5.4 |

Gf

| SIGNAL ID | CH-ID | PORT ID | SNR(dB) |
|---|---|---|---|
| #1 | #1 | P5 | 7.4 |
| #2 | #4 | P8 | 7.4 |
| #3 | #3 | P7 | 6.4 |
| #4 | #2 | P6 | 6.4 | ps
TRANSMISSION DEVICE, CONTROL DEVICE, AND TRANSMISSION METHOD

CROSS-REFERENCE TO RELATED APPLICATION

This application is based upon and claims the benefit of priority of the prior Japanese Patent Application No. 2019-3761, filed on Jan. 11, 2019, the entire contents of which are incorporated herein by reference.

FIELD

The embodiments discussed herein are related to a transmission device, a control device, and a transmission method.

BACKGROUND

For example, there is a technique wherein optical signals having different polarizations are multiplexed and transmitted to an optical fiber (see, for example, Patent Literature 1). In this type of optical multiplexing transmission system, not only polarization but also a wavelength and a space in an optical fiber (for example, a mode or a core) are used as an optical signal channel.

Since a transmission path is provided with not only an optical fiber but also other devices that affect the transmission characteristics of the optical signal such as an optical amplifier, the optical signal has different transmission quality such as (Signal-Noise Ratio) SNR for each channel. For example, propagation loss of the optical fiber, gain and noise figure (NF) of the optical amplifier, and nonlinear optical coefficient depend on the wavelength, mode, and core of the optical signal.

On the other hand, there is a method for improving the transmission quality of each optical signal by optimizing selection of a modulation method used for the optical signal, forward error correction (FEC) redundancy, and the like for each channel; however, the more options for the modulation method and FEC redundancy, the more complicated the configuration and control of optical signal transmitters and receivers. There is also a method for optimizing the power of the optical signal inputted to the optical fiber; however, there are influences on the transmission characteristics of other channels due to the nonlinear optical effect in the optical fiber, changes in gain of the optical amplifier, the upper limit power, and the like, and thus such a method is not effective.

For example, in an optical multiplexing transmission system that multiplexes optical signals of different modes, there is a method for averaging the transmission quality of the optical signal for each channel by Hadamard-transforming an electric field signal.

For example, as related art, Japanese Laid-open Patent Publication No. 2012-124934, K. Shibahara et al., "Space-Time Coding-Assisted Transmission for Mitigation of MDL Impact on Mode-Division Multiplexed Signals", OFC2016, Th4C.4, and the like are disclosed.

SUMMARY

According to an aspect of the embodiments, a transmission device that transmits an optical signal, includes a first signal processing circuit configured to average transmission quality of a first data signal based on a third data signal, a second signal processing circuit configured to average transmission quality of a second data signal based on a fourth data signal, and a processor configured to allocate a channel in a transmission path that transmits the first data signal and a channel in a transmission path that transmits the second data signal, based on a first index value indicating transmission quality of a first optical signal in the transmission path through which the first optical signal is transmitted, the first optical signal being generated based on the averaged first data signal and a second index value indicating transmission quality of a second optical signal in the transmission path through which the second optical signal is transmitted, the second optical signal being generated based on the averaged second data signal.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a diagram illustrating an example of channel allocation;

FIGS. 9A and 9B are flowcharts illustrating another example of channel allocation processing;

FIG. 10 is a diagram illustrating another example of channel allocation;

FIG. 13 is a configuration diagram illustrating another example of a transmission system using wavelength converters;

FIG. 15 is a diagram illustrating another example of channel allocation processing;

DESCRIPTION OF EMBODIMENTS

When averaging means is implemented by, for example, a digital signal processor (DSP), it is required to fix a combination of a plurality of optical signals for averaging the transmission quality in order to avoid an increase in DSP circuit scale and a complicated configuration. Therefore, for example, when the averaging process is performed with a combination of optical signals of channels with high transmission quality, and the averaging process is performed with a combination of optical signals of channels with low transmission quality, there is a problem that variations in transmission quality are not reduced as a whole for the optical signals to be multiplexed and transmitted.

Therefore, it is an object of the present disclosure to provide a transmission device, a control device, and a transmission method capable of reducing variations in transmission quality of optical signals to be multiplexed and transmitted.

Figure 1:
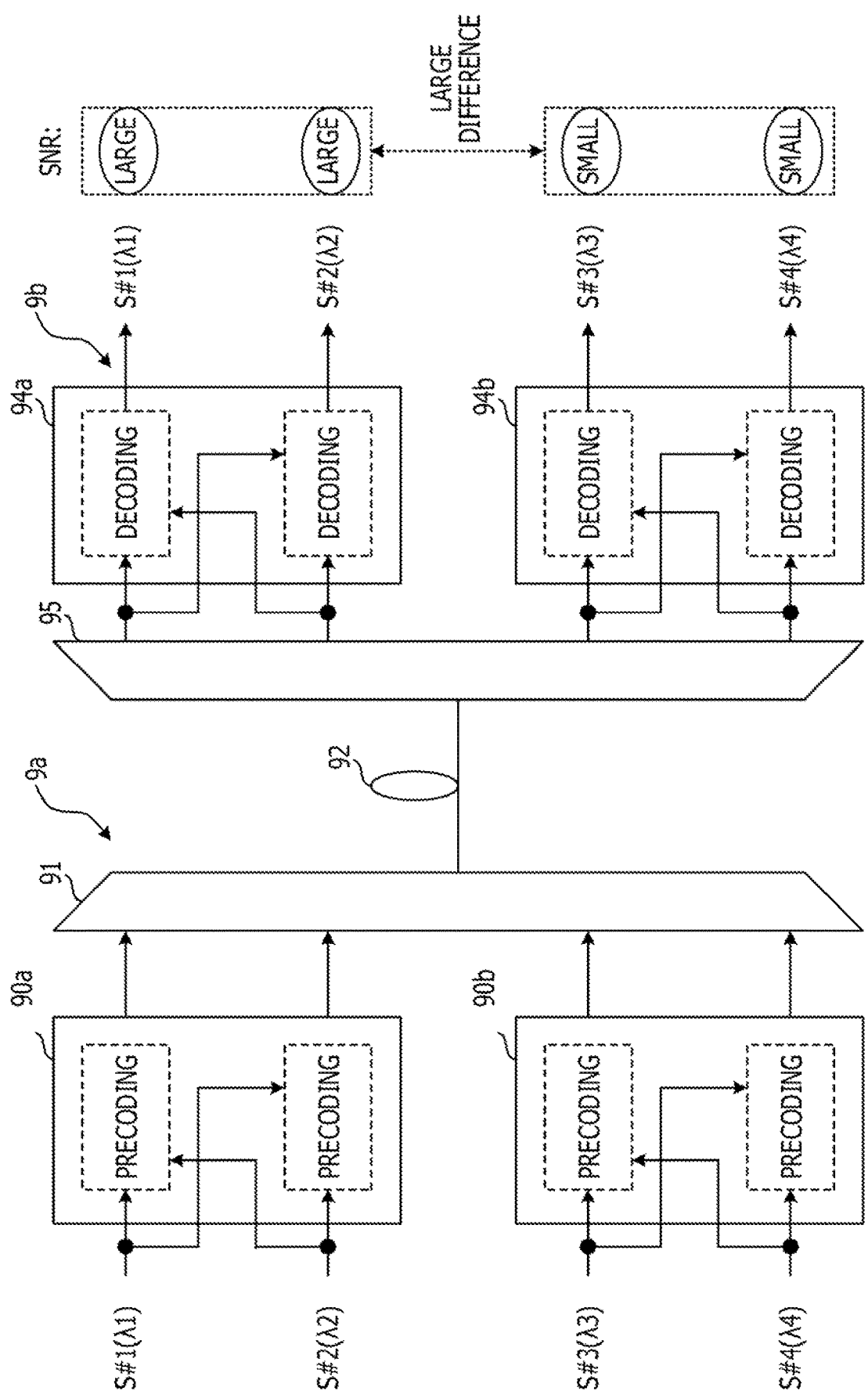
FIG. 1 is a diagram illustrating a transmission quality averaging method according to a comparative example.

FIG. 1 is a diagram illustrating a transmission quality averaging method according to a comparative example. A transmission system includes a transmitting device 9a and a reception device 9b coupled via a transmission path 92 such as an optical fiber. As an example, the transmitting device 9a and the reception device 9b perform wavelength multiplexing transmission of a plurality of optical signals.

The transmitting device 9a includes signal processing units 90a and 90b and a multiplexer 91. The signal processing unit 90a averages transmission qualities of data signals S #1 and S #2 by unitary transforming the pair of data signals S #1 and S #2 as an example. In the following description, the transmission quality averaging process is referred to as "precoding". The unitary transform includes, but not limited to, Hadamard transform, and a transform method called Space-Time codes (space-time code) or Polarization-Time codes (polarization space-time code), for example, may also be used.

The signal processing unit 90b also performs precoding of another set of data signals S #3 and S #4. For example, individual wavelengths λ1 to λ4 are allocated to the data signals S #1 to S #4 as channels. The data signals S #1 to S #4 are transformed into light of wavelengths λ1 to λ4, and then multiplexed into one wavelength multiplexed optical signal by the multiplexer 91 such as an optical coupler and outputted to the transmission path 92.

On the other hand, the reception device 9b includes a demultiplexer 95 and signal processing units 94a and 94b. The demultiplexer 95 demultiplexes the wavelength multiplexed optical signal inputted through the transmission path 92 into the data signals S #1 to S #4 for the wavelengths λ1 to λ4. After demultiplexing, a pair of data signals S #1 and S #2 are transformed into electrical signals and inputted to the signal processing unit 94a, while another pair of data signals S #3 and S #4 are transformed into electrical signals and inputted to the signal processing unit 94b.

The signal processing unit 94a restores the data signals S #1 and S #2 before the unitary transform by performing inverse transform of the unitary transform, as an example, on the pair of data signals S #1 and S #2. The signal processing unit 94b also restores the data signals S #3 and S #4 before the unitary transform by performing inverse transform of the unitary transform, as an example, on the pair of data signals S #3 and S #4. In the following description, the restoration process of the data signals S #1 to S #4 is referred to as "decoding".

The reception device 9b monitors an SNR as an example of the transmission quality of the data signals S #1 to S #4. For example, when the transmission characteristics of the data signals S #1 and S #2 of the wavelengths λ1 and λ2 in the transmission path 92 are better than the transmission characteristics of the data signals S #3 and S #4 of the wavelengths λ3 and λ4, the SNRs of the data signal S #1 and S #2 are larger than the SNRs of the data signals S #3 and S #4 (see SNR "large" and "small"). The SNR is an example of an index value indicating transmission quality.

Therefore, the difference in transmission quality between one pair of data signals S #1 and S #2 and the other pair of data signals S #3 and S #4 is increased. Accordingly, variations in transmission quality as a whole for the data signals S #1 to S #4 are not reduced, Therefore, the transmitting device 9a according to the embodiment allocates the wavelengths λ1 to λ4 to the data signals S #1 to S #4 so that the wavelengths λ1 and λ2 that are high SNR channels and the wavelengths λ3 and λ4 that are low SNR channels are combined as pairs for preceding.

Figure 2:
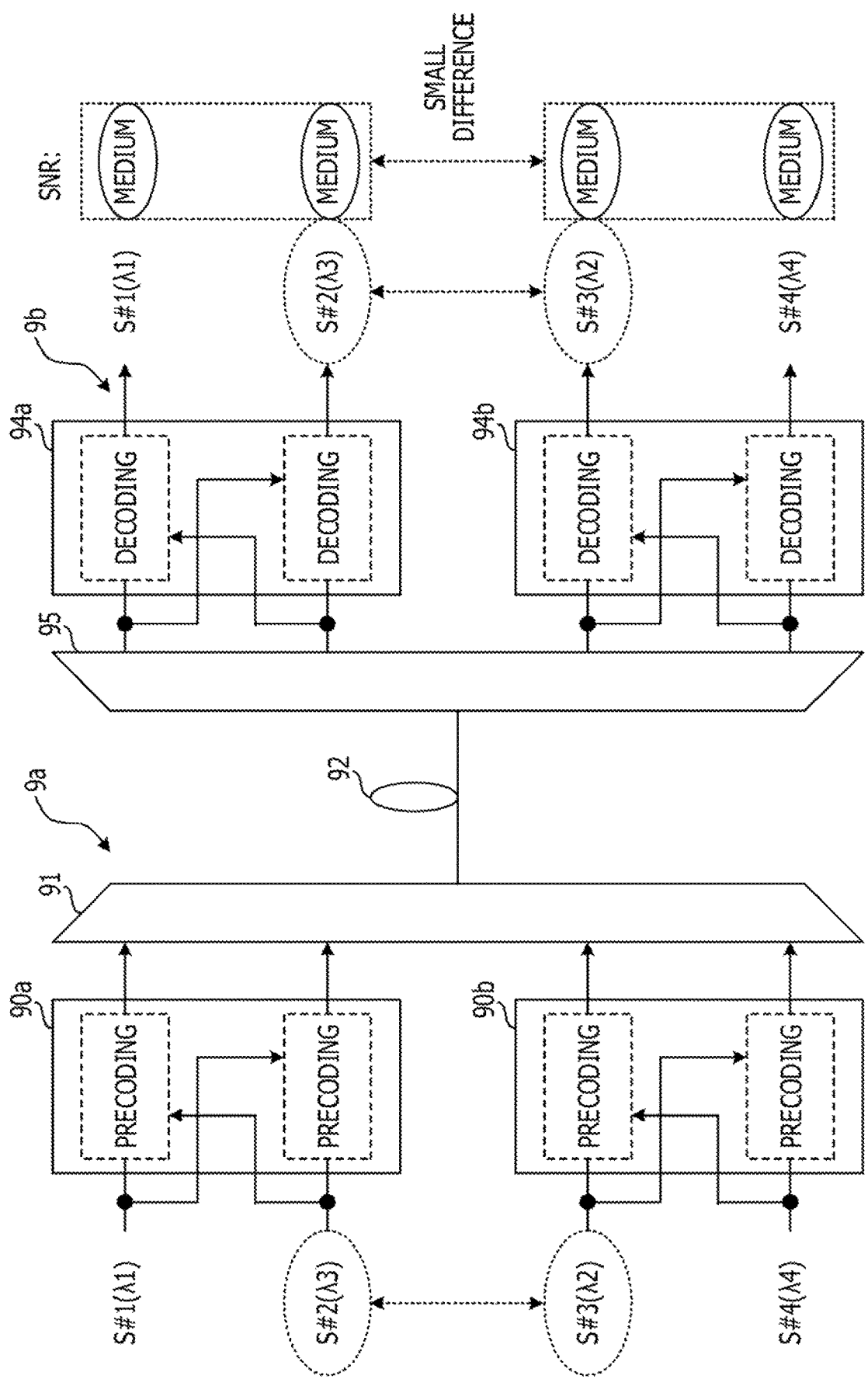
FIG. 2 is a diagram illustrating a transmission quality averaging method according to an embodiment.

FIG. 2 is a diagram illustrating a transmission quality averaging method according to the embodiment. In FIG. 2, constituent's common to those in FIG. 1 are denoted by the same reference numerals, and description thereof is omitted.

In this example, unlike the comparative example, the wavelength λ3 is allocated to the data signal S #2, while the wavelength λ2 is allocated to the data signal S #3. Therefore, the SNR of the data signal S #2 is reduced due to deterioration in transmission characteristics according to the wavelength λ3, while the SNR of the data signal S #3 is increased due to improvement in transmission characteristics according to the wavelength λ2.

Since the signal processing unit 90a precodes the combination of the data signals S #1 and S #2 of the wavelengths λ1 and λ3, the SNR is averaged between the wavelength λ1 that is the high SNR channel and the wavelength λ3 that is the low SNR channel. Since the signal processing unit 90b also precodes the combination of the data signals S #3 and S #4 of the wavelengths λ2 and λ4, the SNR is averaged between the wavelength λ2 that is the high SNR channel and the wavelength λ4 that is the low SNR channel. (see SNR "Medium").

Therefore, the difference in transmission quality between one pair of data signals S #1 and S #2 and the other pair of data signals S #3 and S #4 is reduced. Accordingly, variations in transmission quality are reduced as a whole for the data signals S #1 to S #4.

A configuration for performing channel allocation as described above will be described below, FIG. 3 is a configuration diagram illustrating an example of a transmission system. The transmission system includes a transmitting device 1 that performs wavelength multiplexing transmission by performing channel allocation as described above, a reception device 2, and a network monitoring and control device 5 that monitors and controls the transmitting device 1 and the reception device 2. The network monitoring and control device 5 is an example of a control device that controls the transmitting device 1.

The transmitting device 1 is an example of a transmission device, and transmits a plurality of data signals S #1 to S #4 after wavelength multiplexing thereof, the data signals each having a wavelength allocated as an example of a channel. A wavelength multiplexed optical signal Smux obtained by wavelength multiplexing a plurality of optical signals is inputted to the reception device 2 through the transmission path 92. The reception device 2 receives the wavelength multiplexed optical signal Smux and separates the signal for each of the wavelengths λ1 to λ4 to restore the data signals S #1 to S #4.

The transmitting device 1 includes a control unit 30, transmitters 31a to 31d, and a multiplexer 32. The transmitters 31a to 31d transmit data signals S #1 and S #2 as an example of optical signals, respectively. The multiplexer 32 is, for example, an optical coupler, and combines the data signals S #1 to S #4 from the transmitters 31a to 31d to generate a wavelength multiplexed optical signal Smux and output the wavelength multiplexed optical signal Smux to the transmission path 92.

The transmitters 31a and 31b precode the pair of data signals S #1 and S #2, while the transmitters 31c and 31d precode the pair of data signals S #3 and S #4. Among the data signals S #1 and S #2 and the data signals S #3 and S #4, one of the pairs is an example of a first pair, and the other pair is an example of a second pair.

The reception device 2 includes a control unit 40, a demultiplexer 42, and receivers 41a to 41d. The demultiplexer 42 is, for example, an optical splitter, and demultiplexes the wavelength multiplexed optical signal Smux to each of the receivers 41a to 41d. As will be described later, the receivers 41a to 41d have wavelength tunable optical filters, and receive the data signals S #1 to S #4 by filtering the wavelength multiplexed optical signal Smux for each of the wavelengths λ1 to λ4.

The receivers 41a and 41b decode the pair of data signals S #1 and S #2, while the receivers 41c and 41d decode the pair of data signals S #3 and S #4. Thus, the data signals S #1 to S #4 before precoding are restored.

The receivers 41a to 41d monitor the transmission quality of the data signals S #1 to S #4 and notify the control unit 40 of the SNR as an index value indicating the transmission quality. The control unit 40 generates quality information from the SNR and notifies the generated quality information to the control unit 30 of the transmitting device 1 via, for example, the network monitoring and control device 5. Thus, the control unit 30 acquires the quality information from the reception device 2. The quality information is not limited to this, and may be notified via a line, for example, that transmits a data signal from a node of he reception device 2 to a node of the transmitting device 1.

The control unit 30 allocates a wavelength to each of the data signal S #1 to S #4 based on the quality information so that the difference in transmission quality between the data signals S #1 and S #2 and the data signals S #3 and S #4 is reduced. Examples of wavelength allocation include those illustrated in FIGS. 1 and 2, for example.

The control unit 30 acquires the quality information of the data signals S #1 to S #4 to which the wavelengths λ1 to λ4 are allocated, respectively, from the reception device 2. Therefore, the control unit 30 may acquire quality information with higher accuracy, for example, compared with the case where the SNR of each of the data signals S #1 to S #4 is predicted from the wavelength multiplexed optical signal Smux transmitted from the transmitting device 1.

As an example, the control unit 30 changes the wavelength λ2 of the data signal S #2 to the wavelength λ3 so that the wavelength λ1 that maximizes the SNR and the wavelength λ3 that minimizes the SNR are allocated to the data signals S #1 and S #2 as a pair for precoding, respectively. The control unit 30 also changes the wavelength λ3 of the data signal S #3 to the wavelength λ2 so that the wavelength λ2 with the second largest SNR and the wavelength λ4 with the second smallest SNR are allocated to the data signals S #3 and S #4 as a pair for precoding, respectively. The wavelengths λ1 to λ4 are changed by setting the central wavelength of a light source of the data signals S #1 to S #4, for example.

The control unit 30 also notifies the control unit 40 in the reception device 2 of setting information indicating the allocation of the wavelengths λ1 to λ4 via the network monitoring and control device 5. Based on the setting information, the control unit 40 sets the wavelengths λ1 to λ4 of the data signals S #1 to S #4 received by the receivers 41a to 41d. Therefore, the reception device 2 may normally receive the data signals S #1 to S #4 even when the transmitting device 1 changes the wavelength allocation for the data signals S #1 to S #4. The setting information is not limited to this, and may be stored in the data signals S #1 to S #4 and notified to the reception device 2, for example.

Figure 4A:
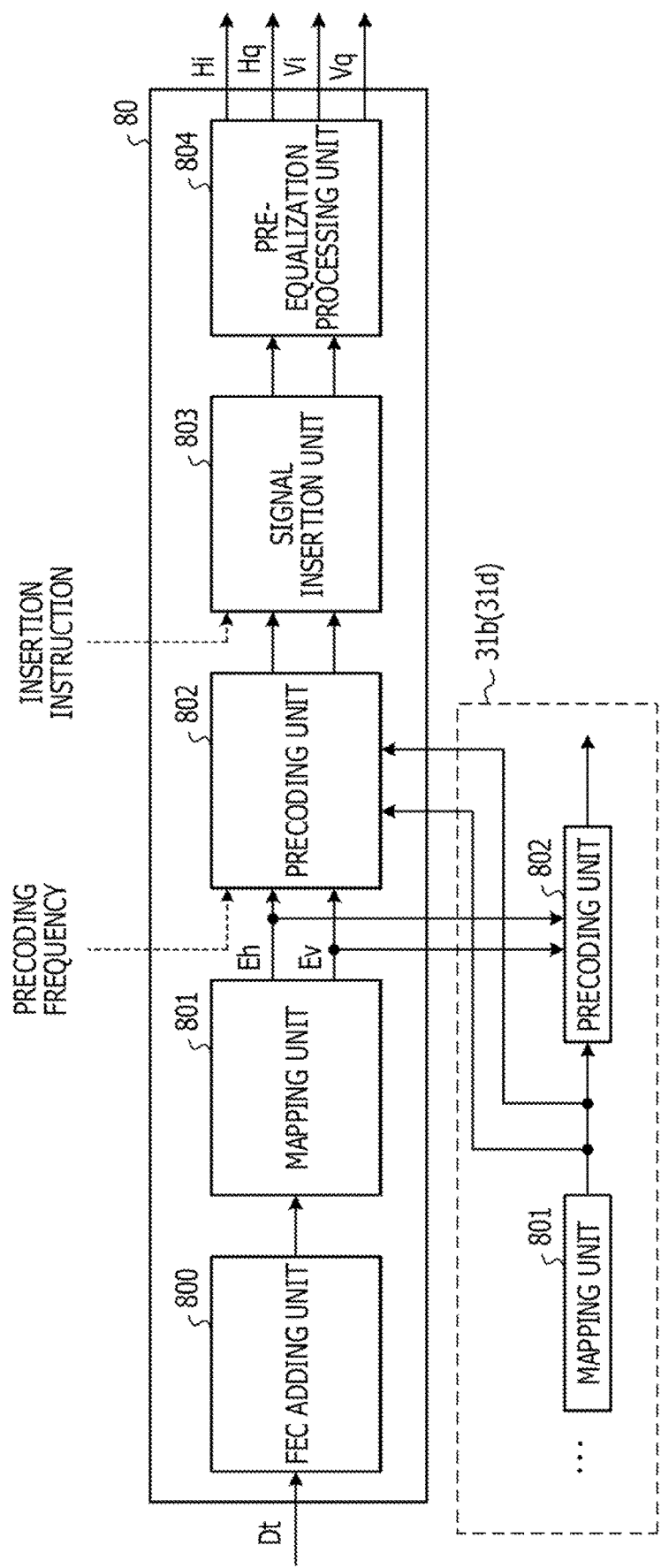
FIGS. 4A and 4B are configuration diagrams illustrating an example of transmitters.
Figure 4B:
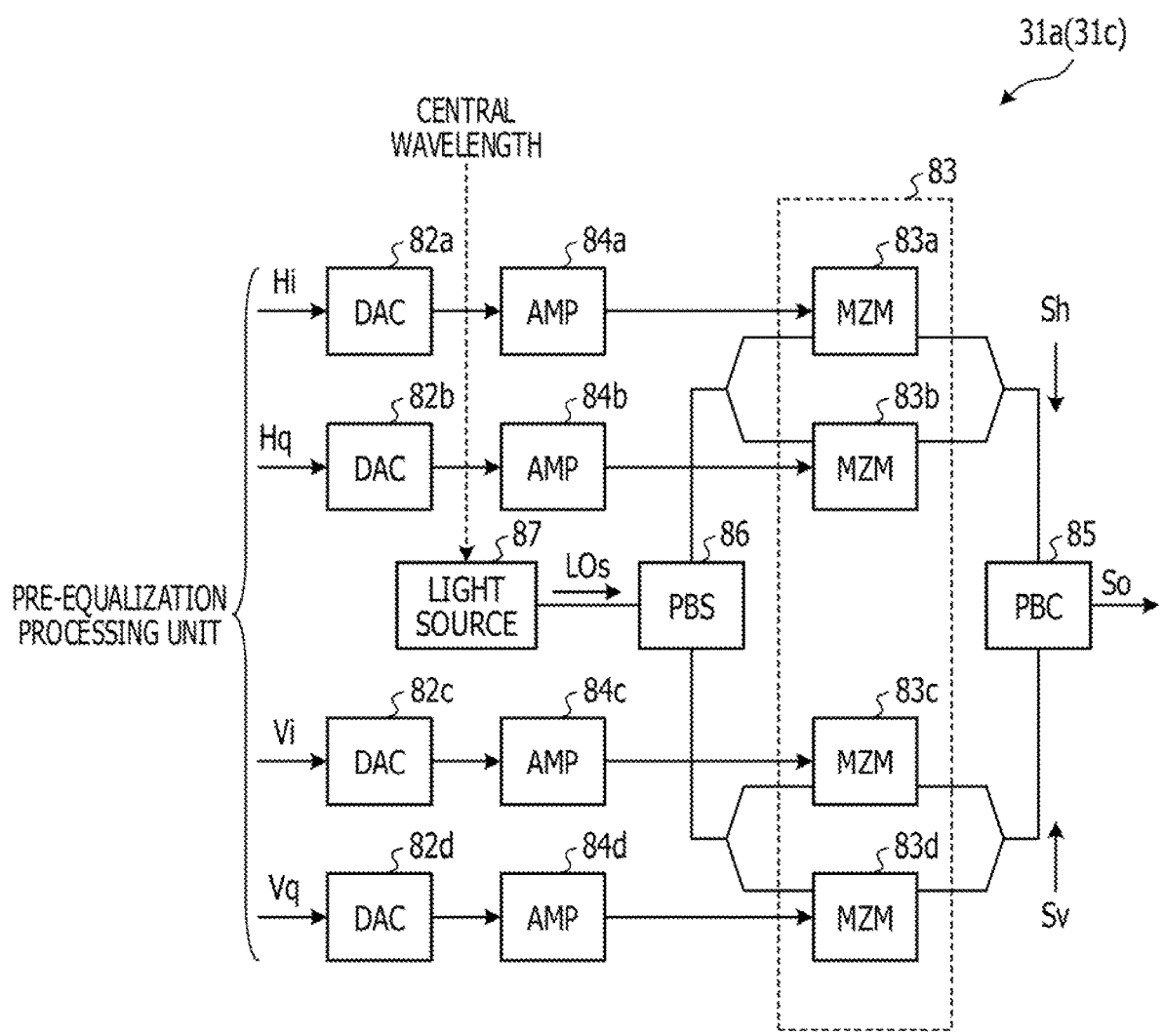

FIGS. 4A and 4B are configuration diagrams illustrating an example of the transmitters 31a to 31d. FIGS. 4A and 4B illustrate, together with the configurations of the transmitters 31a and 31c, only a mapping unit 801 and a precoding unit 802 of the transmitters 31b and 31d to be paired up with the transmitters 31a and 31c for precoding; however, the overall configuration of the transmitters 31b and 31d is the same as that of the transmitters 31a and 31c.

The transmitters 31a to 31d transmit data signals S #1 to S #4 according to a digital coherent optical transmission system using a polarization multiplexing method. In FIGS. 4A and 4B, the data signals S # 1 to S #4 that are electrical signals are expressed as Dt, while the data signals S #1 to S #4 that are optical signals are expressed as So.

The transmitters 31a to 31d each include a transmission processing circuit 80, digital-to-analog converters (DACs) 82a to 82d, amplifiers (AMPs) 84a to 84d, and a modulation unit 83. The modulation unit 83 includes Mach-Zehnder modulators (MZMs) 83a to 83d. The transmitters 31a to 31d each further include a polarization beam combiner (PBC) 85, a polarization beam splitter (PBS) 86, and a light source 87.

The transmission processing circuit 80 receives an electrical data signal Dt from another device or a subsequent processing circuit, for example, and outputs digital signals Hi, Hq, Vi, and Vq generated from the data signal Dt. The data signal Dt includes, but not limited to, an Ethernet (registered trademark) signal, for example.

The digital signals Hi and Hq are an in-phase component and a quadrature phase component of an electric field signal Eh corresponding to an H polarization component (polarized light Sh) of the data signal So, respectively. The digital signals Vi and Vq are an in-phase component and a quadrature component of an electric field signal Ev corresponding to a V polarization component (polarized light Sv) of the data signal So, respectively, The transmission processing circuit 80 includes a forward error correction (FEC) adding unit 800, the mapping unit 801, the precoding unit 802, a signal insertion unit 803, and a pre-equalization processing unit 804. Examples of the transmission processing circuit 80 include, but not limited to, a digital signal processor (DSP), and a field-programmable gate array (FPGA) may be used, for example.

The FEC adding unit 800 inserts an FEC code, which is an example of an error correction code, into the data signal Dt. The FEC code is located at the end of the frame of the data signal Dt, for example. The FEC adding unit 800 outputs the data signal Dt to the mapping unit 801.

The mapping unit 801 maps the data signal Dt to symbols according to the modulation method. Examples of the modulation method Include, but not limited to quadrature phase shift keying (QPSK) and binary phase shift keying (BPSK), and quadrature amplitude modulation (QAM) may also be used.

The mapping unit 801 performs serial-parallel conversion, for example, to divide the data signal Dt into two data strings to be allocated to H-axis and V-axis polarization components. The mapping unit 801 performs mapping processing on the data signal Dt for each data string, and outputs the data string of each polarization component to the precoding unit 802 as electric field signals Eh and Ev, respectively.

The electric field signals Eh and Ev are inputted to the precoding unit 802 from the mapping unit 801 in the preceding stage and the mapping unit 801 that is the counterpart of the precoding pair, respectively.

For example, the precoding unit 802 of the transmitter 31a receives the electric field signals Eh and Ev from the mapping unit 801 in the preceding stage and the mapping unit 801 of the transmitter 31b that is the counterpart of the precoding pair, and the precoding unit 802 of the transmitter 31b receives the electric field signals Eh and Ev from the mapping unit 801 in the preceding stage and the mapping unit 801 of the transmitter 31a. As in the case of the transmitters 31a and 31b, the precoding units 802 of the transmitters 31c and 31d receive the electric field signals Eh and Ev from the mapping units 801, respectively.

Each of the precoding units 802 of the transmitters 31a and 31b averages transmission quality by performing unitary transform on the data signals S #1 and S #3. Each of the precoding units 802 of the transmitters 31c and 31d averages transmission quality by performing unitary transform on the data signals S #2 and S #4.

Therefore, the precoding unit 802 may easily perform an averaging process by general-purpose numerical calculation. For the precoding unit 802, an averaging process frequency (hereinafter referred to as "precoding frequency") is set by the control unit 30. One of the precoding units 802 of the transmitters 31a and 31b and the precoding units 802 of the transmitters 31c and 31d is an example of a first signal processing unit, while the other is an example of a second signal processing unit. The precoding unit 802 outputs the electric field signals Eh and Ev to the signal insertion unit 803.

In accordance with an insertion instruction from the control unit 30, the signal insertion unit 803 inserts a predetermined pattern reference signal for monitoring the transmission quality of the unprecoded data signals S #1 to S #4 into the electric field signal Eh outputted from the precoding unit 802. The reference signal includes a training sequence (TS) that is a synchronization pattern of the frame of the data signal Dt and a pilot symbol (PS) that is a test pattern. The signal insertion unit 803 outputs the electric field signals Eh and Ev to the pre-equalization processing unit 804, respectively.

The pre-equalization processing unit 804 performs pre-equalization processing on the electric field signals Eh and Ev. For example, the pre-equalization processing unit 804 suppresses the distortion of the signal waveform due to the transmission path characteristics by electrically giving the characteristics opposite to the transmission path characteristics of the transmission path 92 to the electric field signals Eh and Ev in advance. The pre-equalization processing unit 804 outputs the electric field signals Eh and Ev to the DACs 82a to 82d as digital signals Hi, Hq, Vi, and Vq, respectively.

The DACs 82a to 82d convert the digital signals Hi, Hq, Vi, and Vq into analog signals, respectively. The analog signals are amplified by the AMPs 84a to 84d and then inputted to the MZMs 83a to 83d. The DACs 82a to 82d may be configured in the transmission processing circuit 80.

The light source 87 includes, for example, a laser diode or the like, and outputs transmission light LOs having a central wavelength set by the control unit 30 to the PBS 86. The PBS 86 separates the transmission light LOs into an H axis and a V axis (polarization axis). The H polarization component of the transmission light LOs is inputted to the MZMs 83a and 83b, respectively, and the V polarization component of the transmission light LOs is inputted to the MZMs 83c and 83d, respectively.

The modulation unit 83 optically modulates the transmission light LOs based on the electric field signals Eh and Ev to generate polarized light Sh and Sv orthogonal to each other. The MZMs 83a to 83d optically modulate the transmission light LOs based on the analog signals from the DACs 82a to 82d. For example, the MZMs 83a and 83b optically modulate the H-axis component of the transmission light LOs based on the analog signals from the DACs 82a and 82b, while the MZMs 83c and 83d optically modulate the V-axis component of the transmission light LOs based on the analog signals from the DACs 82c and 82d.

The optically modulated H-axis component and V-axis component of the transmission light LOs are inputted to the PBC 85 as polarized light Sh and Sv. The PBC 85 generates a data signal So by polarization combining the H-axis component and the V-axis component of the transmission light LOs, and outputs the data signal So to the transmission path 92.

Figure 5A:
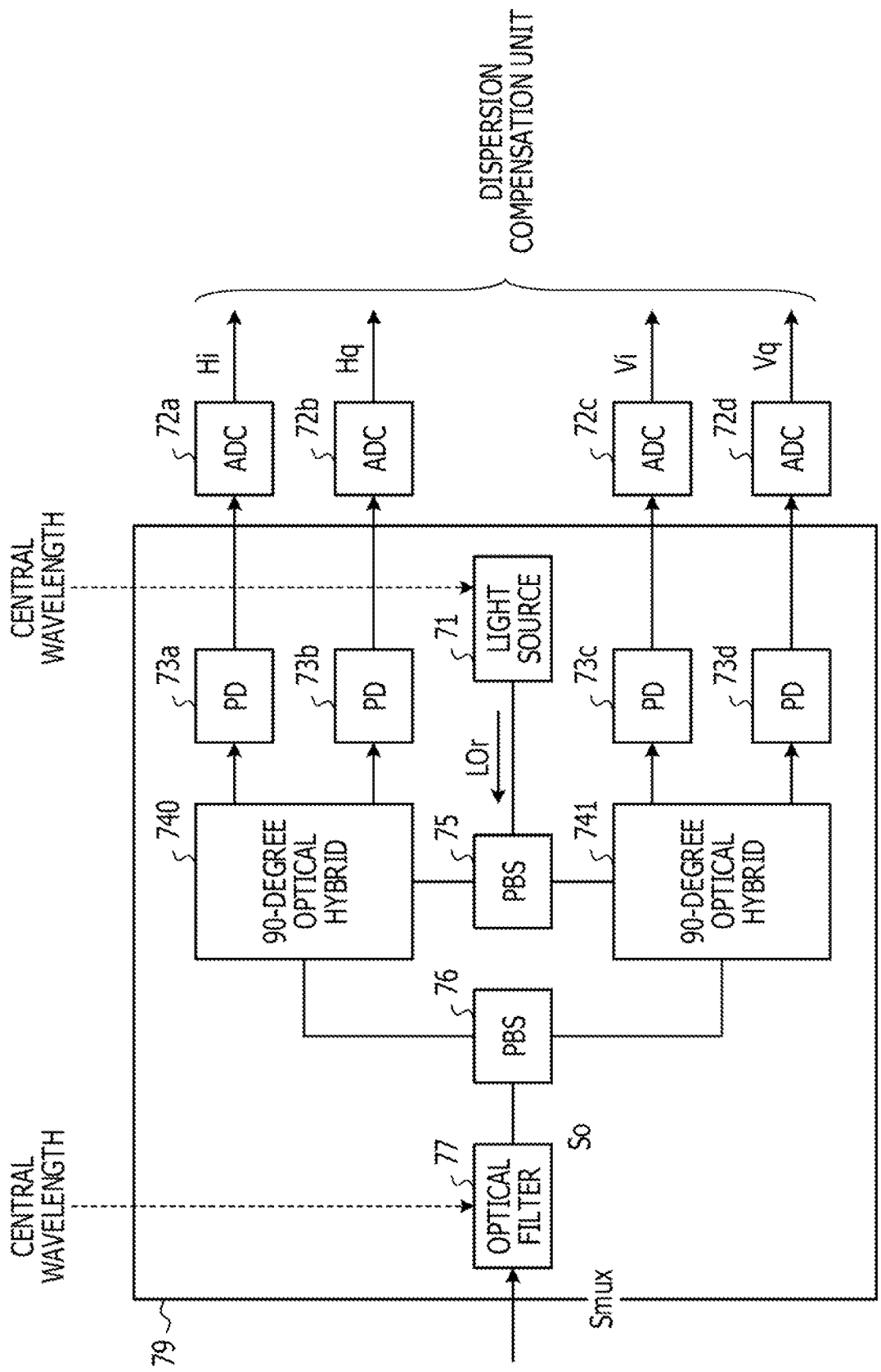
FIGS. 5A and 5B are configuration diagrams illustrating an example of receivers.
Figure 5B:
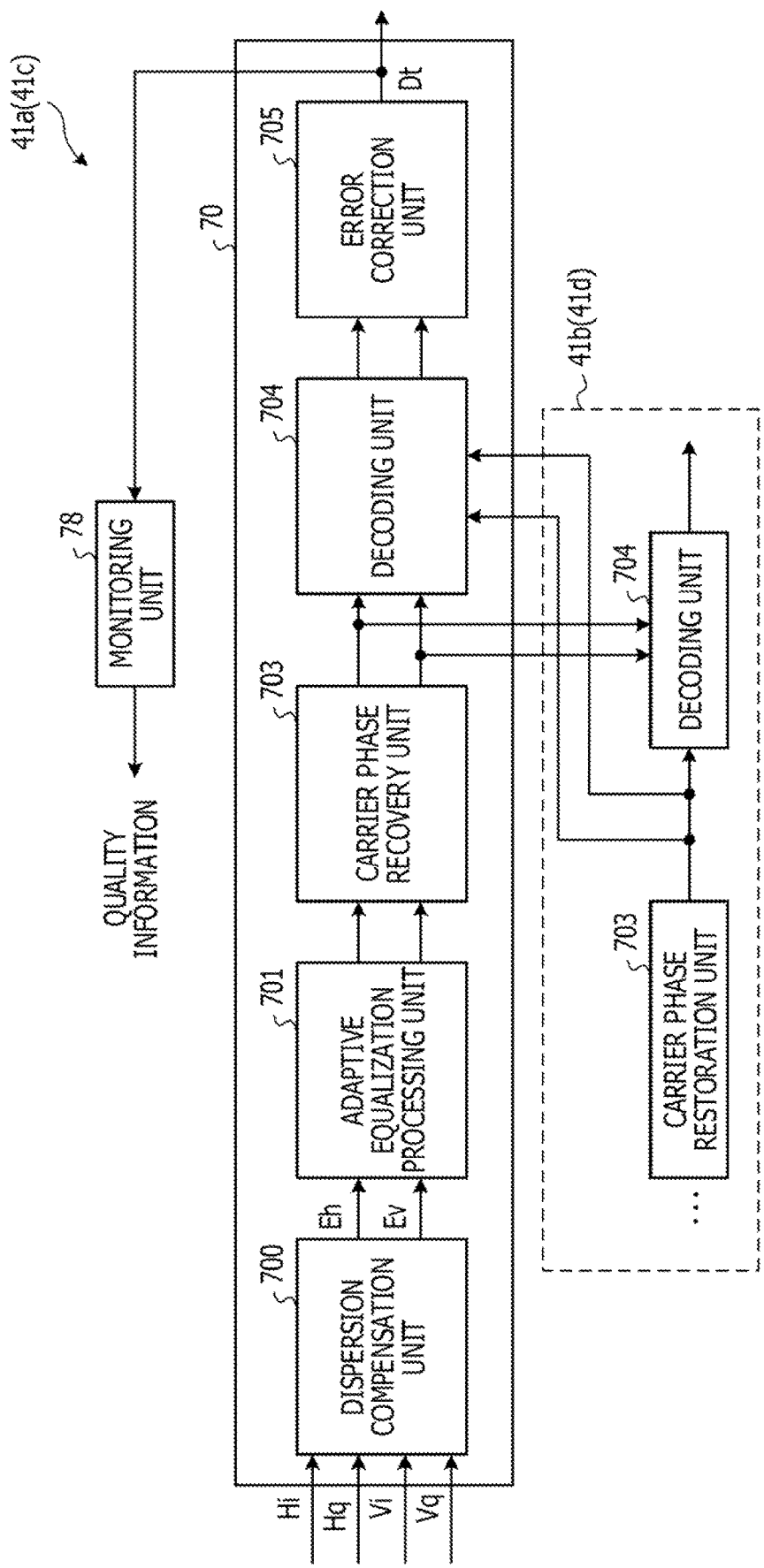

FIGS. 5A and 5B are configuration diagrams illustrating an example of the receivers 41a to 41d. The receivers 41a to 41d receive the data signals So from the transmitters 31a to 31d. FIGS. 5A and 5B illustrate, together with the configurations of the receivers 41a and 41c, only carrier phase recovery units 703 and decoding units 704 of the receivers 41b and 41d to be paired up with the receivers 41a and 41c for decoding; however, the overall configuration of the receivers 41b and 41d is the same as that of the receivers 41a and 41c.

The receivers 41a to 41d each include a reception processing circuit 70, analog-to-digital converters (ADCs) 72a to 72d, a monitoring unit 78, and a front end unit 79. The front end unit 79 includes a light source 71, balanced photodiodes (PDs) 73a to 73d, 90-degree optical hybrid circuits 740 and 741, PBSs 75 and 76, and an optical filter 77.

The front end unit 79 is an example of a signal conversion unit, which receives the wavelength multiplexed optical signal Smux from the transmitters 31a to 31d for conversion into electric field signals Eh and Ev, respectively, by separating the data signal So included in the wavelength multiplexed optical signal Smux into polarized light Sh and Sv. The optical filter 77 separates the data signal So from the wavelength multiplexed optical signal Smux and outputs the data signal to the PBS 76. In this event, the central wavelength of the data signal So to be separated is set by the control unit 40.

The PBS 76 separates the data signal So into polarized light Sh and Sv to be outputted to the 90-degree optical hybrid circuits 740 and 741, respectively. The light source 71 includes a laser diode or the like, for example, and inputs local light LOr having the central wavelength set by the control unit 40 to the PBS 75. The PBS 75 separates the local light LOr into H-axis and V-axis components and outputs those components to the 90-degree optical hybrid circuits 740 and 741, respectively.

The 90-degree optical hybrid circuit 740 has a waveguide for causing the polarized light Sh and the H-axis component of the local light LOr to interfere with each other, and detects the polarized light Sh. The 90-degree optical hybrid circuit 740 outputs optical components corresponding to the amplitude and phase of the in-phase component and the quadrature phase component to the PDs 73a and 73b, respectively, as the detection results.

The 90-degree optical hybrid circuit 741 has a waveguide for causing the polarized light Sv and the V-axis component of the local light LOr to interfere with each other, and detects the polarized light Sv. The 90-degree optical hybrid circuit 741 outputs optical components corresponding to the amplitude and phase of the in-phase component and the quadrature component to the PDs 73c and 73d, respectively, as the detection results.

The PDs 73a to 73d convert the optical components inputted from the 90-degree optical hybrid circuits 740 and 741 into electrical signals, and output the electrical signals to the ADCs 72a to 72d, respectively. The ADCs 72a to 72d convert the electrical signals inputted from the PDs 73a to 73d into digital signals Hi, Hq, Vi, and Vq, respectively. The digital signals Hi, Hq, Vi, and Vq are inputted to the reception processing circuit 70.

The reception processing circuit 70 includes a dispersion compensation unit 700, an adaptive equalization processing unit 701, a carrier phase recovery unit 703, a decoding unit 704, and an error correction unit 705. Examples of the reception processing circuit 70 include, but not limited to, a DSP, and may be an FPGA, for example. The reception processing circuit 70 may also include functions other than those described above.

The dispersion compensation unit 700 compensates for waveform distortion of the data signal So caused by the wavelength dispersion on the transmission path 92, based on fixed parameters. The dispersion compensation unit 700 outputs the digital signals Hi, Hq, Vi, and Vq to the adaptive equalization processing unit 701 as electric field signals Eh and Ev.

The adaptive equalization processing unit 701 performs adaptive equalization processing on the electric field signals Eh and Ev. For example, the adaptive equalization processing unit 701 compensates for waveform distortion of the data signal So caused by wavelength dispersion, nonlinear optical effect, or the like on the transmission path 92, based on dynamic parameters.

The adaptive equalization processing unit 701 compensates for quality degradation of the data signal So. For example, the adaptive equalization processing unit 701 uses a finite impulse response (FIR) filter to impart characteristics opposite to the characteristics of the transmission path 92 to the electric field signals Eh and Ev, thereby correcting the waveforms of the electric field signals Eh and Ev. The adaptive equalization processing unit 701 outputs the electric field signals Eh and Ev to the carrier phase recovery unit 703.

The carrier phase recovery unit 703 removes phase noise components from the electric field signals Eh and Ev, estimates the correct carrier phase, and synchronizes the phases of the electric field signals Eh and Ev with the estimated carrier phase. The carrier phase recovery unit 703 outputs the electric field signals Eh and Ev to the decoding unit 704.

The electric field signals Eh and Ev are inputted to the decoding unit 704 from the carrier phase recovery unit 703 in the preceding stage and the carrier phase recovery unit 703 of the decoding unit 704 that is the counterpart of the decoding pair.

For example, the decoding unit 704 of the receiver 41a receives the electric field signals Eh and Ev from the carrier phase recovery unit 703 in the preceding stage and the carrier phase recovery unit 703 of the receiver 41b that is the counterpart of the decoding pair, while the decoding unit 704 of the receiver 41b receives the electric field signals Eh and Ev from the carrier phase recovery unit 703 in the preceding stage and the carrier phase recovery unit 703 of the receiver 41a. As in the case of the receivers 41a and 41c, the decoding units 704 of the receivers 41b and 41d also receive the electric field signals Eh and Ev from the carrier phase recovery units 703, respectively. The decoding unit 704 decodes the electric field signals Eh and Ev and outputs the decoded signals to the error correction unit 705.

The error correction unit 705 reproduces the data signal Dt from the electric field signals Eh and Ev, and performs error correction processing of the data signal Dt by soft decision based on the FEC code added to the data signal Dt. The error correction processing is performed for each frame of the data signal. Dt. The data signal Dt thus restored is outputted to another device.

The monitoring unit 78 monitors the transmission quality of the data signal Dt. The monitoring unit 78 calculates, for example, an SNR from the data signal Dt, and outputs the SNR to the control unit 40 as quality information. The monitoring unit 78 includes, for example, a DSP, an FPGA, or the like.

Figure 6:
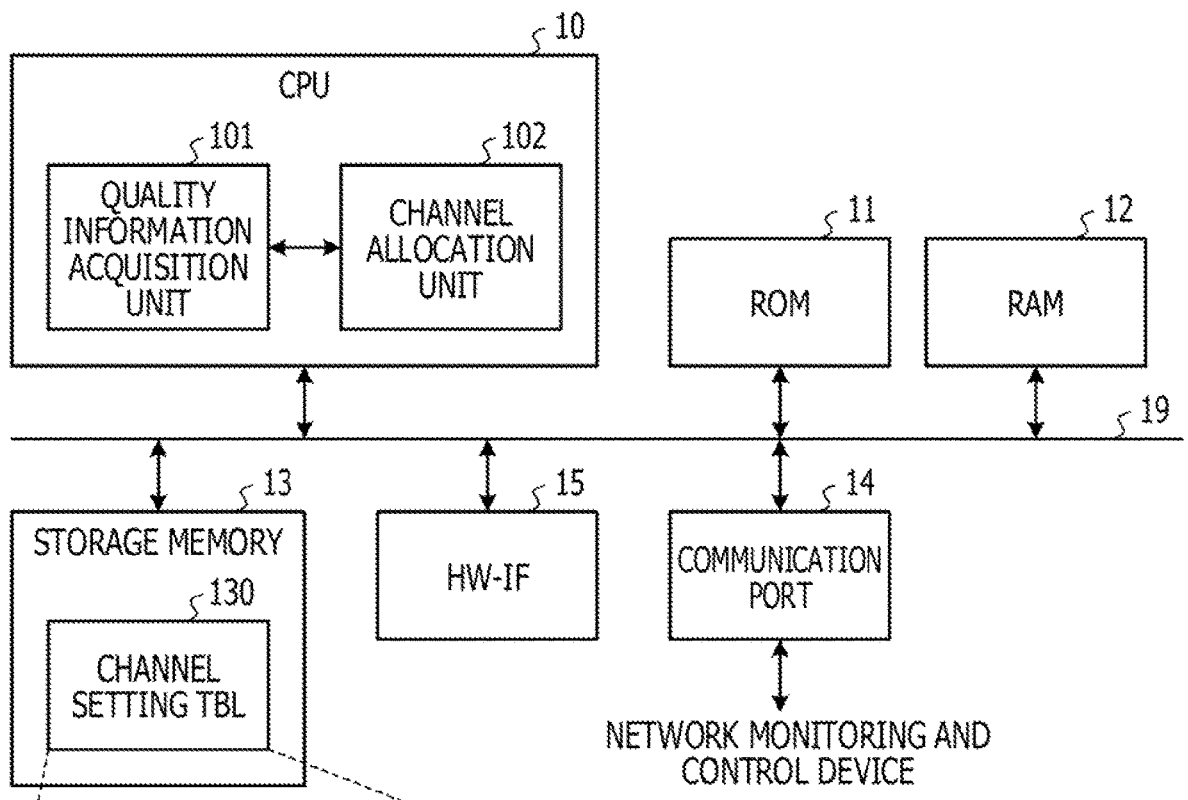
FIG. 6 is a configuration diagram illustrating an example of a control unit.

FIG. 6 is a configuration diagram illustrating an example of the control unit 30. The control unit 30 includes a central processing unit (CPU) 10, a read-only memory (ROM) 11, a random-access memory (RAM) 12, a storage memory 13, a communication port 14, and a hardware interface (HW-IF) unit 15. The CPU 10 is coupled to the ROM 11, the RAM 12, the storage memory 13, the communication port 14, and the HW-IF 15 through a bus 19.

The ROM 11 stores a program for driving the CPU 10. The RAM 12 functions as a working memory for the CPU 10. The communication port 14 is, for example, a local area network (LAN) port and processes communications between the network monitoring and control device 5 and the CPU 10.

When the CPU 10 reads the program from the ROM 11, a quality information acquisition unit 101 and a channel allocation unit 102 are formed as functions. The storage memory 13 stores a channel setting table (TBL) 130.

The quality information acquisition unit 101 is an example of an acquisition unit, which acquires the SNRs of the data signals S #1 to S #4 from the reception device 2 in accordance with instructions from the channel allocation unit 102. The channel allocation unit 102 is an example of an allocation unit, which allocates any one of the wavelengths λ1 to λ4 as a channel to the data signals S #1 to S #4 based on the SNR so that a difference in transmission quality between the data signals S #1, S #2 and the data signals S #3, S #4 is reduced. For example, as described above, the channel allocation unit 102 performs wavelength allocation so that the high SNR wavelength and the low SNR wavelength among the wavelengths λ1 to λ4 are paired up for precoding.

The channel allocation unit 102 sets the central wavelength for the fight source 71, for example, via the HW-IF 15. The channel allocation unit 102 performs various settings and instructions for other hardware in the transmitting device 1 via the HW-IF 15.

In the channel setting table 130, information related to the channel allocation of the data signals S #1 to S #4 is registered. In the channel setting table 130, for example, signal IDs #1 to #4 of identifiers of the data signals S #1 to S #4, CH-IDs #1 to #4 which are channel identifiers, the wavelengths λ1 to λ4 corresponding to the channels, and SNRs are registered. The control unit 40 of the reception device 2 also includes a CPU circuit similar to the above, for example.

Figure 7:
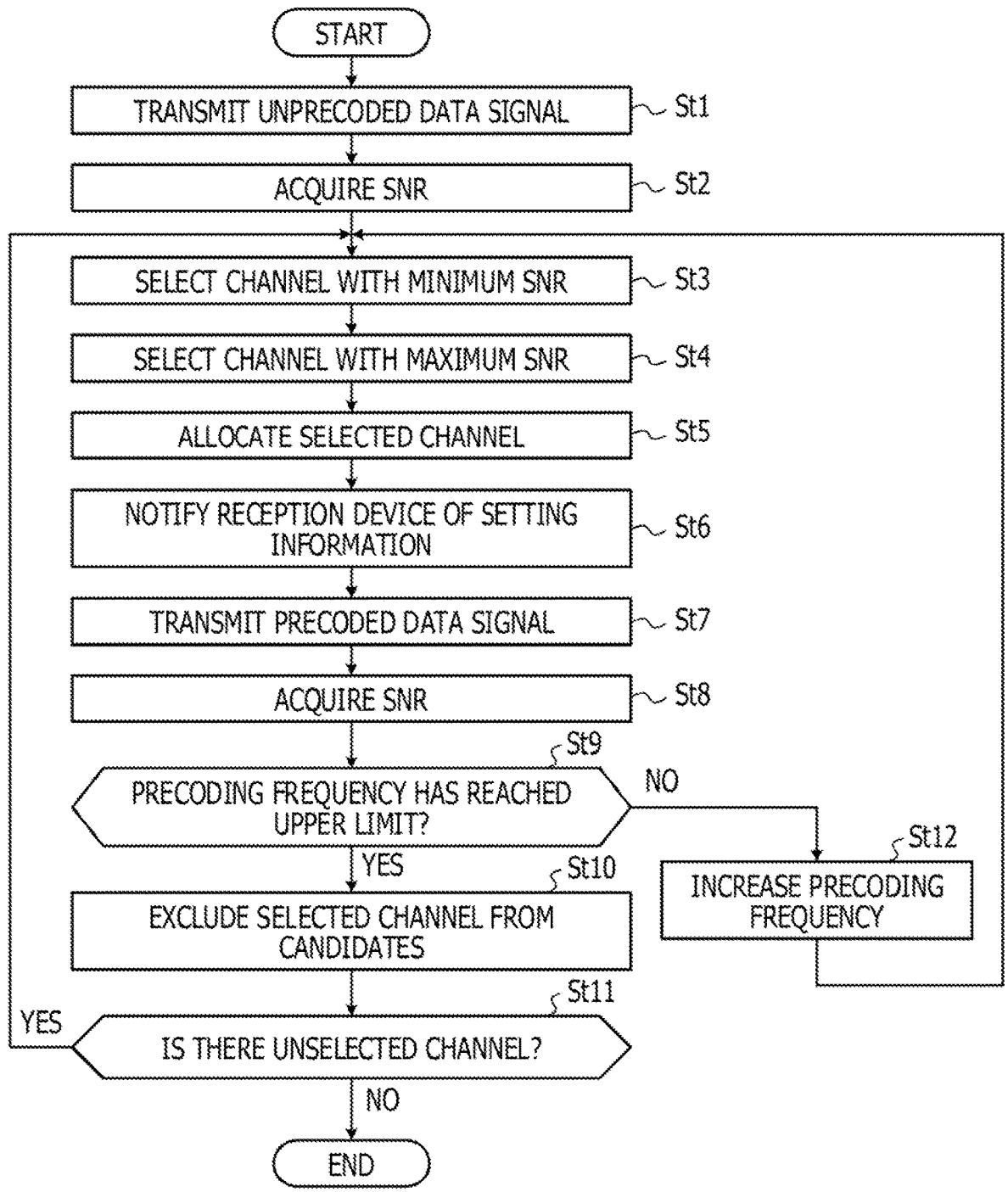
FIG. 7 is a flowchart illustrating an example of channel allocation processing.

FIG. 7 is a flowchart illustrating an example of channel allocation processing. The channel allocation processing is executed, for example, when the transmission quality of the data signals S #1 to S #4 no longer satisfies a predetermined standard, and when a new transmitter, that is, a data signal is added to the transmitting device 1. Prior to this processing, the channel allocation unit 102 sets the precoding frequency for the precoding unit 802 of each of the transmitters 31a to 31d to one.

The channel allocation unit 102 instructs the signal insertion unit 803 to insert reference signals into the data signals S #1 to S #4 so that unprecoded data signals S #1 to S #4 are transmitted to the reception device 2 (Step St1). In this event, CH-IDs #1 to #4, for example, are allocated to the data signals S #1 to S #4 as initial settings.

Next, the quality information acquisition unit 101 acquires the quality information including the SNR of each of the unprecoded data signals S #1 to S #4 from the reception device 2 via the communication port 14 (Step St2). In this event, the quality information acquisition unit 101 registers the SNR in the channel setting table 130. The SNR when precoding is not performed is acquired by inserting reference signals into the data signals S #1 to S #4; however, the present disclosure is not limited thereto, and the data signals S #1 to S #4 with no reference signals inserted therein may also be acquired by monitoring between the carrier phase recovery unit 703 and the decoding unit 704 of the reception device 2.

Then, the channel allocation unit 102 selects a channel having the smallest SNR (Step St3), and selects a channel having the maximum SNR (Step St4) from channel candidates to be allocated to the data signals S #1 to S #4. For example, the channel allocation unit 102 refers to the SNRs in the channel setting table 130 to select the CH-ID having the maximum SNR and the CH-ID having the minimum SNR.

Thereafter, the channel allocation unit 102 allocates the currently selected channel pair to the data signals S #1 to S #4 as the precoding pairs, respectively (Step St5). For example, the channel allocation unit 102 allocates the currently selected wavelength of each channel to the data signals S #1 and S #2 of the transmitters 31a and 31b as the precoding pair or the data signals S #3 and S #4 of the transmitters 31c and 31d as the precoding pair.

The channel allocation unit 102 sets the central wavelength of the transmission light LOs in the light sources 87 of the transmitters 31a and 31b or the transmitters 31c and 31d according to the wavelengths λ1 to λ4 of each channel being selected. Thus, the transmitters 31a and 31b (or the transmitters 31c and 31d) transmit the data signals S #1 and S #2 (or the data signals S #3 and S #4) of the wavelength of each selected channel.

Next, the channel allocation unit 102 notifies the reception device 2 via the communication port 14 of setting information indicating channel allocation of the wavelength of each selected channel to the data signals S #1 and S #2 (or the data signals S #3 and S #4) (Step St6). The control unit 40 of the reception device 2 sets the central wavelength corresponding to the wavelength allocated to the data signals S #1 to S #4 in the optical filter 77 and the light source 71 of each of the receivers 41a to 41d according to the setting information. Accordingly, the receivers 41a to 41d may normally receive the data signals S #1 and S #2 (or the data signals S #3 and S #4).

Next, the channel allocation unit 102 instructs the signal insertion unit 803 to stop the insertion of reference signals into the data signals S #1 to S #4 so that the precoded data signals S #1 to S #4 are transmitted to the reception device 2 (Step St7). Then, the quality information acquisition unit 101 acquires the quality information including the SNR of each of the precoded data signals S #1 to S #4 from the reception device 2 via the communication port 14 (Step St8).

Thereafter, the channel allocation unit 102 determines whether or not the precoding frequency for the data signals S #1 and S #2 (or the data signals S #3 and S #4) with each selected channel allocated thereto has reached an upper limit (Step St9). The upper limit of the precoding frequency is determined according to the hardware configuration, for example, and may be different for each of the transmitters 31a to 31d, or may be the same.

When the precoding frequency has not reached the upper limit (No in Step St9), the channel allocation unit 102 increases the precoding frequency for the precoding unit 802 (Step St12). Thereafter, each process after Step St3 is executed again.

When the precoding frequency has reached the upper limit (Yes in Step St9), the channel allocation unit 102 excludes the selected channel from the channel candidates to be allocated to the remaining data signals S #3 and S #4 (or the data signals S #1 and S #2) (Step St10). Since the data signals S #1 and S #2 (or the data signals S #3 and S #4) to which the currently selected channel is allocated are thus determined, the channel allocation unit 102 updates the channel setting table 130 for the allocated channel.

Next, the channel allocation unit 102 determines whether or not there is an unselected channel among the remaining channel candidates (Step St11). When there is an unselected channel (Yes in Step St11), each process after Step St3 is executed. When there is no unselected channel (No in Step St11), this process is terminated. The allocation processing is thus executed.

Next, an example of channel allocation processing will be described.

FIG. 8 is a diagram illustrating an example of channel allocation. Reference numeral Ga denotes the channel setting table 130 before channel allocation, while reference numeral Gb denotes the channel setting table 130 after channel allocation.

Each channel setting table 130 represents a constellation on the reception side for each of the data signals S #1 to S #4 (signal IDs #1 to #4). The modulation method for the data signals S #1 to S #4 is QPSK as an example, but is not limited thereto. In this example, the upper limit of the precoding frequency for each of the transmitters 31a to 31d is 1.

Before the allocation processing, the wavelengths λ1 to λ4 are set as initial settings for the data signals S #1 to S #4, respectively. The SNRs of the data signals S #1 to S #4 indicate values when precoding is not performed. The SNRs of the data signals S #1 and S #2 are higher than the SNRs of the data signals S #3 and S #4, the SNR varies significantly across the data signals S #1 to S #4. Therefore, there is a clear difference in signal point distribution between the constellation of the data signals S #1 and S #3 and the constellation of the data signals S #2 and S #4.

The channel allocation unit 102 selects a channel #1 (CH-ID #1) with a wavelength λ1 having a maximum SNR (14 (dB)) and a channel #4 (CH-ID #4) with a wavelength λ4 having a minimum SNR (5.4 (dB)). The channel allocation unit 102 allocates the wavelengths λ1 and λ4 of the channels #1 and #4 to the data signals S #1 and S #2 as the precoding pair, respectively. Since the precoding frequency has reached the upper limit, the channels #1 and #4 are excluded from the channel candidates.

Next, the channel allocation unit 102 selects a channel #2 (CH-ID #2) with a wavelength λ2 having the second largest SNR (11.2 (dB)) and a channel #3 (CH-ID #3) with a wavelength λ3 having the second smallest SNR (6.9 (dB)). The channel allocation unit 102 allocates the wavelengths λ2 and λ3 of the channels #2 and #3 to the data signals S #3 and S #4 of the precoding pair, respectively. Since the precoding frequency has reached the upper limit, the channels #3 and #4 are excluded from the channel candidates. Since there are no other channel candidates left, the channel allocation unit 102 terminates the allocation processing.

After the allocation processing, the SNRs of the precoded data signals S #1 and S #2 with the wavelengths λ1 and λ4 allocated thereto, respectively, are both 7.4 (dB), and the SNRs of the precoded data signals S #3 and S #4 with the wavelengths λ3 and λ2 allocated thereto, respectively, are both 6.4 (dB). Therefore, as compared with the SNRs before the allocation processing, the SNR variation is reduced across the data signals S #1 to S #4. Accordingly, the difference in signal point distribution between the constellation of the data signals S #1 and S #3 and the constellation of the data signals S #2 and S #4 is also reduced.

As described above, the channel allocation unit 102 allocates the wavelengths as channels to the data signals S #1 to S #4 based on the SNRs so that the difference in transmission quality between the data signals S #1 and S #2 and the data signals S #3 and S #4 is reduced. Thus, variations in transmission quality across the data signals S #1 to S #4 dependent on the wavelength are reduced.

Although the SNR is used as the index value of transmission quality in this example, the present disclosure is not limited thereto, and an SNR margin (hereinafter simply referred to as "margin") may be used as in the following example. The margin is an SNR difference with respect to a lower limit of the SNR determined by the FEC limit according to the encoding scheme of the FEC adding unit 800.

Figure 9B:
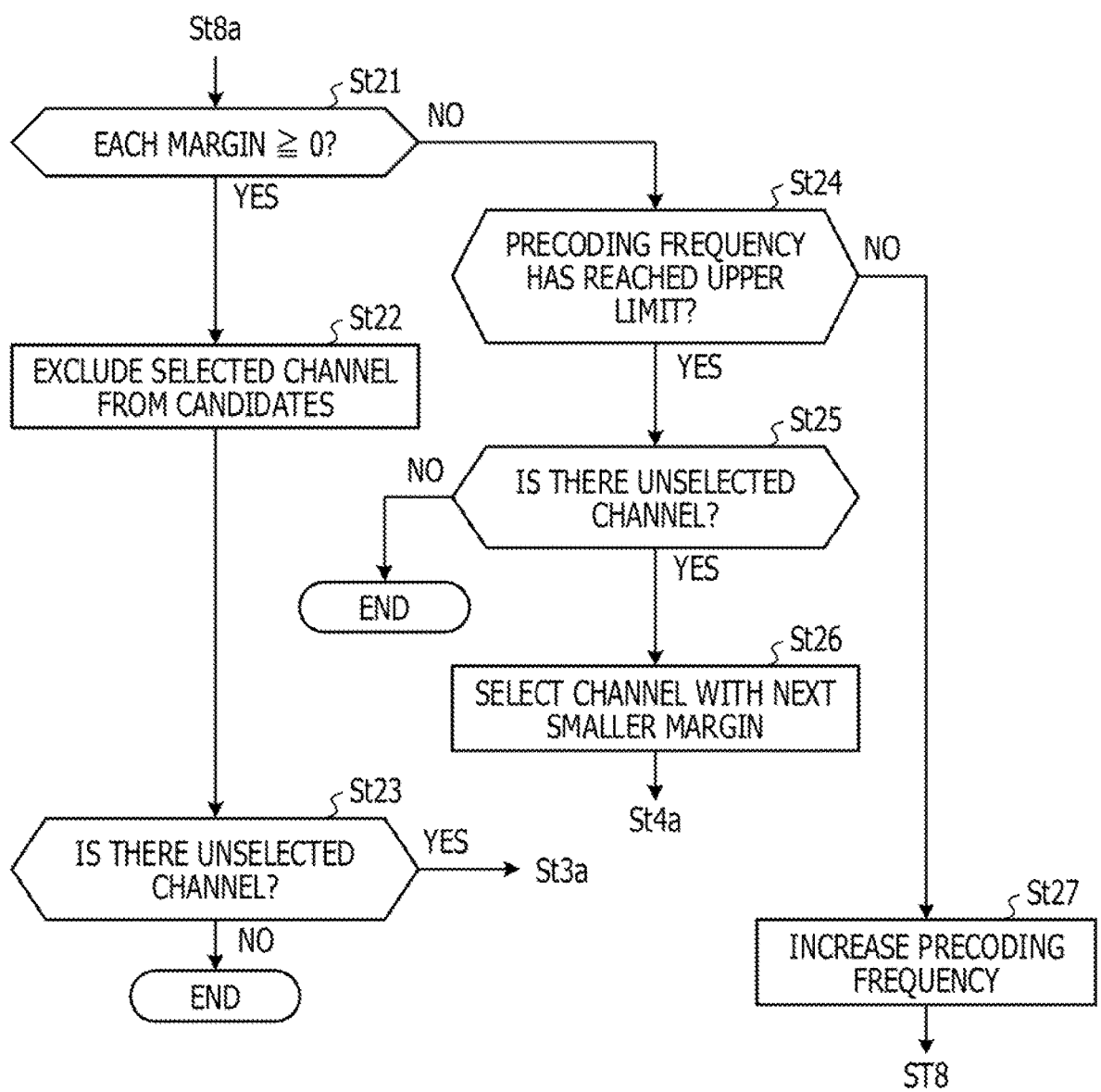

FIGS. 9A and 9B are flowcharts illustrating another example of channel allocation processing. In FIGS. 9A and 9B, constituents common to those in FIG. 7 are denoted by the same reference numerals, and description thereof is omitted.

The quality information acquisition unit 101 calculates a margin from the SNR and the FEC limit (Step St2a). The margin is registered in the channel setting table 130. The channel allocation unit 102 selects a channel with the smallest margin (Step St3a) and selects a channel with the largest margin (Step St4a) from the channel candidates. The channel allocation unit 102 allocates the selected channel to the data signals S #1 and S #2 (or the data signals S #3 and S #4) (Step St5) and notifies the reception device 2 of the setting information (Step St6).

After acquiring the SNRs of the precoded data signals S #1 and S #2 (or the data signals S #3 and S #4) (Step St8), the quality information acquisition unit 101 calculates margins from the SNR and the FEC limit. (Step St8a). The margin is registered in the channel setting table 130.

When the margins of the data signals S #1 and S #2 (or the data signals S #3 and S #4) are 0 or more (Yes in Step St21), the channel allocation unit 102 excludes the selected channels from the candidates (Step St22). Thus, the allocation of the selected channels is determined.

As described above, the channel allocation unit 102 selects channels to be allocated to the data signals S #1 to S #4 based on the SNRs when the precoding is not performed, thereby determining the channels to be allocated to the data signals S #1 to S #4 based on the SNRs when the precoding is performed. Therefore, the channel allocation unit 102 may accurately determine the transmission quality for each channel, and may more effectively reduce the variations in transmission quality of the data signals S #1 to S #4.

Next, the channel allocation unit 102 determines whether or not there is any unselected channel among the remaining channel candidates (Step St23). When there is an unselected channel (Yes in Step St23), each process after Step St3a is executed. When there is no unselected channel (No in Step St23), this processing is terminated.

When any of the margins of the data signals S #1 and S #2 (or the data signals S #3 and S #4) is less than 0 (No in Step St21), the channel allocation unit 102 determines whether or not the precoding frequency of the transmitters 31a to 31d for the data signals with the margins less than 0 has reached the upper limit (Step St24). When the precoding frequency is less than the upper limit (No in Step St24), the channel allocation unit 102 performs setting for increasing the precoding frequency for the precoding unit 802 (Step St27). Thereafter, each process after Step St8 is executed.

Thus, the channel allocation unit 102 increases the precoding frequency when the margin is less than 0. Therefore, the power consumption within the precoding unit 802 may be increase, for example; however, the margin may be improved. In this example, the transmission quality standard is that the margin is 0 or more; however, the present disclosure is not limited thereto, and the transmission quality standard may be that the margin is 1 or more, for example.

When the precoding frequency has reached the upper limit (Yes in Step St24), the channel allocation unit 102 determines whether or not there is any unselected channel in the remaining channel candidates (Step St25). When there is an unselected channel (Yes in Step St25), the channel allocation unit 102 selects, instead of the channel with the smaller SNR, the channel with the next smaller SNR among the selected channels (Step St26). For example, when the channel with the smallest SNR is selected, the channel allocation unit 102 selects the channel with the second smallest SNR instead of that channel. Thereafter, each process after Step St4a is executed.

As described above, when the margin is less than 0, the channel allocation unit 102 changes the selection of channels to be allocated to the data signals S #1 to S #4 when the precoding frequency has reached the upper limit. Therefore, the channel allocation unit 102 may perform channel allocation except for the channels for which the margin may not be improved because the precoding frequency has reached the upper limit. The channel candidates may include those left unallocated.

When there is no unselected channel (No in Step St25), this processing is terminated. The channel allocation processing is thus executed.

Next, an example of channel allocation processing will be described.

FIG. 10 is a diagram illustrating another example of channel allocation. Reference numeral Gc denotes a channel setting table 130 before channel allocation, while reference numeral Gd denotes a channel setting table 130 after channel allocation.

Each channel setting table 130 represents a constellation on the reception side for each of the data signals S #1 to S #4 (signal IDs #1 to #4). The modulation method for the data signals S #1 to S #4 is QPSK as an example, but is not limited thereto. In this example, the upper limit of the precoding frequency for each of the transmitters 31a to 31d is 1. In this example, unlike the example of FIG. 8, SNR margins are added to the channel setting table 130. The lower limit of the SNR based on the FEC limit is 7.0 (dB).

Before the allocation processing, the wavelengths λ1 to λ4 are set as initial settings for the data signals S #1 to S #4, respectively. The margins of the data signals S #1 to S #4 indicate values when precoding is not performed. The margins of the data signals S #1 and S #2 are larger than 0; however the margins of the data signals S #3 and S #4 are smaller than 0, and the margin varies significantly across the data signals S #1 to S #4. Therefore, there is a clear difference in signal point distribution between the constellation of the data signals S #1 and S #3 and the constellation of the data signals S #2 and S #4.

The channel allocation unit 102 selects a channel #1 (CH-ID #1) with a wavelength λ1 having the maximum margin (+7.0 (dB)) and a channel #4 (CH-ID #4) with a wavelength λ4 with the minimum margin (−1.6 (dB)). The channel allocation unit 102 allocates the wavelengths λ1 and λ4 of the channels #1 and #4 to the data signals S #1 and S #2 as the precoding pair, respectively.

Since the margins of the precoded data signals S #1 and S #2 are both +0.4 (dB) (>0), the channel allocation unit 102 determines that the transmission quality standard is satisfied, and excludes the channels #1 and #4 from the channel candidates. Thus, the allocation of the channels #1 and #4 is determined.

Next, the channel allocation unit 102 selects a channel #2 (CH-ID #2) with a wavelength λ2 having the second largest margin (+4.2 (dB)) and a channel #3 (CH-ID #3) with a wavelength λ3 with the second smallest margin (−0.1 (dB)). The channel allocation unit 102 allocates the wavelengths λ3 and λ2 of the channels #3 and #2 to the data signals S #3 and S #4 as the precoding pair, respectively.

Since the margins of the precoded data signals S #3 and S #4 are both +1.4 (dB) (>0), the channel allocation unit 102 determines that the transmission quality standard is satisfied, and excludes the channels #3 and #2 from the channel candidates. Thus, the allocation of the channels #3 and #2 is determined. Since there are no other channel candidates left, the channel allocation unit 102 terminates the allocation processing.

After the allocation processing, the margins of the precoded data signals S #1 and S #2 with the wavelengths λ1 and λ4 allocated thereto are both +0.4 (dB), and the margins of the precoded data signals S #3 and S #4 with the wavelengths λ3 and λ2 allocated thereto are both +1.4 (dB). Therefore, compared with the margin before the allocation processing, variations in margin are reduced across the data signals S #1 to S #4. Accordingly, the difference in signal point distribution between the constellation of the data signals S #1 and S #3 and the constellation of the data signals S #2 and S #4 is also reduced.

Thus, the channel allocation unit 102 allocates wavelengths as channels to the data signals S #1 to S #4 based on the margins so that the difference in transmission quality between the data signals S #1 and S #2 and the data signals S #3 and S #4 is reduced. Thus, variations in transmission quality across the data signals S #1 to S #4 dependent on the wavelength are reduced. As the index value for the transmission quality, a bit error rate before error correction by FEC, an error vector magnitude (EVM), or the like may also be used.

(Transmission System Using Wavelength Converters)

In the above example, the channel allocation unit 102 allocates wavelengths to the data signals S #1 to S #4 by setting the central wavelength of the transmission light LOs of the transmitters 31a to 31d; however, the present disclosure is not limited thereto, and the wavelengths may be allocated by setting wavelengths after wavelength conversion of the data signals S #1 to S #4.

Figure 3:
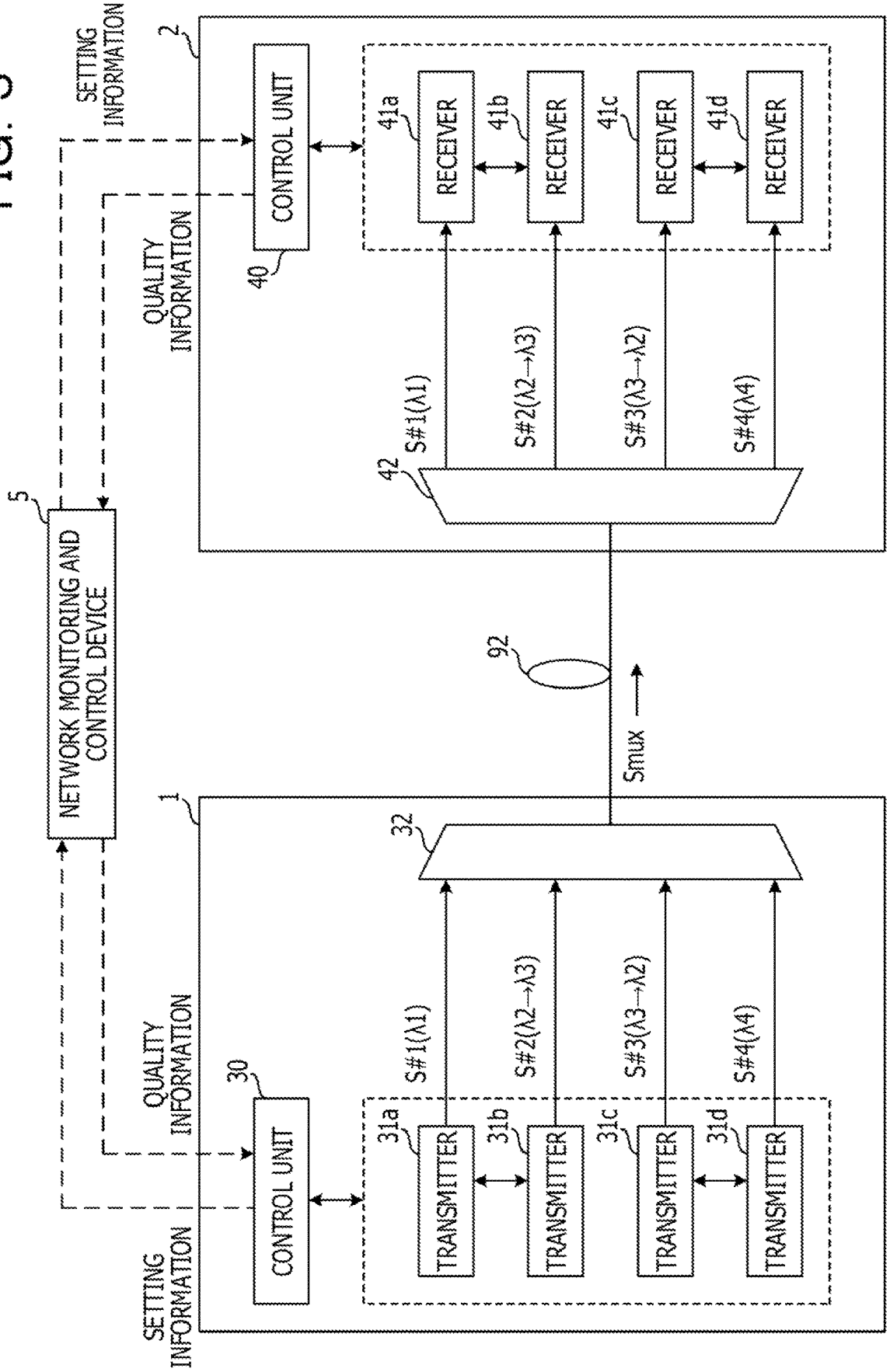
FIG. 3 is a configuration diagram illustrating an example of a transmission system.
Figure 11:
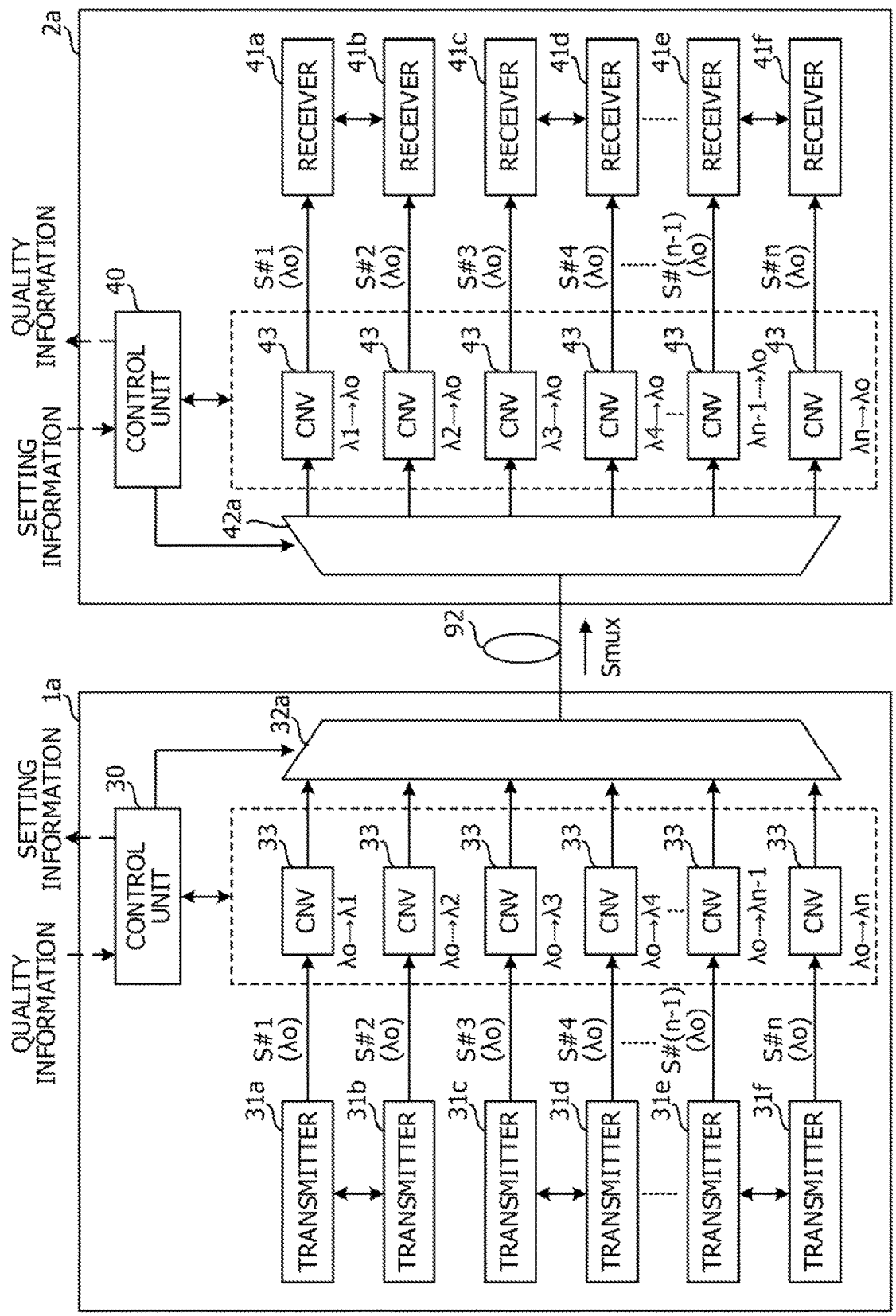
FIG. 11 is a configuration diagram illustrating an example of a transmission system using wavelength converters.

FIG. 11 is a configuration diagram illustrating an example of a transmission system using wavelength converters 33 and 43. In FIG. 11, constituents common to those in FIG. 3 are denoted by the same reference numerals, and description thereof is omitted.

The transmitting device 1a is another example of the transmission device, which includes transmitters 31a to 31f, the same number of wavelength converters (CNV) 33 as the transmitters 31a to 31f, a multiplexer 32a, and a control unit 30. The transmitters 31e and 31f have the same configuration as that of the other transmitters 31a to 31d. The pair of transmitters 31a and 31b, the pair of transmitters 31c and 31d, and the pair of transmitters 31e and 31f transmit data signals S #1 to S #n (n: positive integer) of preceding pairs, respectively.

The transmitters 31a to 31f transmit data signals S #1 to S #n having a common wavelength λo, and the wavelength λo is converted into other wavelengths λ1 to λn by the wavelength converter 33. The wavelength converter 33 converts the wavelengths λo of the data signals S #1 to S #n inputted from the transmitters 31a to 31f into wavelengths λ1 to λn according to settings from the control unit 30.

The control unit 30 allocates any one of the wavelengths λ1 to λn to the data signals S #1 to S #n by setting a wavelength shift amount of the wavelength converter 33, for example. FIG. 11 illustrates the case where the wavelengths λ1 to λn are allocated to the data signals S #1 to S #n, respectively, as an example. The wavelength converted data signals S #1 to S #n are inputted to the multiplexer 32a.

The multiplexer 32a is, for example, a wavelength selection switch, which multiplexes the data signals S #1 to S #n to generate a wavelength multiplexed optical signal Smux. The control unit 30 sets the wavelengths λ1 to λn after the conversion by the wavelength converter 33 to the input port of the multiplexer 32a. The wavelength multiplexed optical signal Smux is inputted to the reception device 2a via the transmission path 92.

The reception device 2a includes receivers 41a to 41f, the same number of wavelength converters 43 as the receivers 41a to 41f, a demultiplexer 42a, and a control unit 40. The wavelength multiplexed optical signal Smux is inputted to the demultiplexer 42a.

The demultiplexer 42a is, for example, a wavelength selection switch, which demultiplexes the data signals S #1 to S #n having the wavelengths λ1 to λn from the wavelength multiplexed optical signal Smux. The control unit 40 sets the wavelengths λ1 to λn to the output port of the demultiplexer 42a so that the data signals S #1 to S #n are inputted to the respective receivers 41a. The data signals S #1 to S #n are inputted from the demultiplexer 42a to the respective wavelength converters 43.

The wavelength converters 43 each convert the wavelengths λ1 to λn of the data signals S #1 to S #n into a common wavelength λo according to the setting from the control unit 40. The control unit 40 sets a wavelength shift amount of the wavelength converter 43 in accordance with the wavelength λo after wavelength conversion. The data signals S #1 to S #n are inputted from the wavelength converters 43 to the receivers 41a to 41f. The receivers 41e and 41f have the same configuration as the other receivers 41a to 41d.

Figure 12:
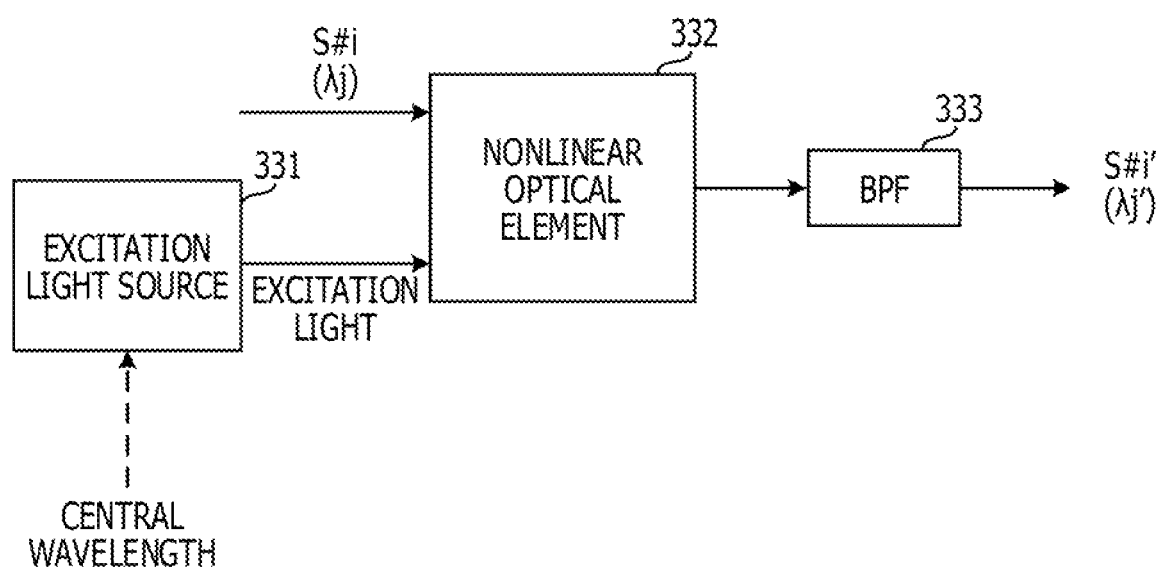
FIG. 12 is a configuration diagram illustrating an example of the wavelength converter.

FIG. 12 is a configuration diagram illustrating an example of the wavelength converters 33 and 43. The wavelength converters 33 and 43 include an excitation light source 331 such as a laser diode, a nonlinear optical element 332 such as a highly nonlinear fiber or a highly nonlinear semiconductor waveguide, and a band pass filter (BPF) 333.

The nonlinear optical element 332 receives the excitation light from the excitation light source 331 and data signal S #i (i=1, 2, . . . , n) having wavelengths λj (=λ1 to λn, λo). In the nonlinear optical element 332, four-wave mixing occurs, for example, between the excitation light and the data signal S #i. Idler light generated by the four-wave mixing is extracted as a wavelength converted data signal S #i' by the BPF 333. The BPF 333 may be provided when it is desired to remove unwanted frequency component light, and does not have to be provided in the wavelength converters 33 and 43.

The idler light is generated at a target position on the frequency axis across the excitation light with respect to the data signal S #i. Therefore, the wavelength of the idler light takes a target value across the central wavelength of the excitation light with respect to the wavelength λj of the data signal S #i. Therefore, the control units 30 and 40 may change the wavelength shift amount of the wavelength conversion by controlling the central wavelength of the excitation light at the excitation light source 331. In this example, the case where the wavelength conversion is performed using four-wave mixing has been described; however, other nonlinear optical effects may be used for wavelength conversion.

Thus, the wavelength converters 33 and 43 are provided in the transmission system. Therefore, even when the central wavelength of the transmission light LOs that may be set to the light source 87 of the transmitters 31a to 31f and the central wavelength of the local light LOr that may be set to the light source 71 of the receivers 41a to 41f are limited, the transmitters 31a to 31f and the receivers 41a to 41f may transmit and receive the data signals S #1 to S #n having a single wavelength λo. The transmitters 31a to 31f and the receivers 41a to 41f may transmit and receive data signals S #1 to S #n having a plurality of wavelengths instead of the single wavelength λo.

The control unit 30 allocates wavelengths to the data signals S #1 to S #n by setting the wavelength shift amount of each wavelength converter 33a in the process of Step St5 described above. Thus, variations in the transmission quality of the data signals S #1 to S #n are reduced. The control unit 40 of the reception device 2a sets the wavelength converter 43 according to the setting information notified from the control unit 30.

(Other Transmission Systems Using Wavelength Converters)

When the wavelength converters 33 and 43 are used as in the above example, the transmission quality of the data signals S #1 to S #n after the wavelength conversion is lower than that before the wavelength conversion.

Therefore, not all the data signals S #1 to S #n but only some data signals S #2, S #4, . . . , S #n may be subjected to the wavelength conversion, and precoding pairs may be formed with the other data signals S #1, S #3, . . . , S #(n-1) not to be subjected to the wavelength conversion. Thus, variations in transmission quality may be more effectively reduced.

FIG. 13 is a configuration diagram illustrating another example of a transmission system using wavelength converters 33a and 43a. In FIG. 13, constituents common to those in FIG. 11 are denoted by the same reference numerals, and description thereof is omitted.

A transmitting device 1b is another example of the transmission device, which includes transmitters 31a to 31f, a wavelength converter (CNV) 33a, multiplexers 32b and 32c, and a control unit 30. The transmitters 31a to 31f transmit data signals S #1 to S #n, respectively. The data signals S #1 to S #n are inputted from the transmitters 31a to 31f to the multiplexer 32b, respectively.

The multiplexer 32b is a wavelength selection switch, for example, which outputs the data signals S #1 to S #n from one of two output ports P1 and P2 to the multiplexer 32c in the subsequent stage according to the setting of the control unit 30. The wavelength converter 33a is provided between the output port P2 and the multiplexer 32c. The wavelength converter 33a has the same configuration as that of the wavelength converters 33 and 43 illustrated in FIG. 12.

The multiplexer 32b is, for example, a wavelength selection switch, which generates a wavelength multiplexed optical signal Smux by multiplexing the data signals S #1 to S #n inputted from the output ports P1 and P2 of the multiplexer 32b in the preceding stage. The wavelength multiplexed optical signal Smux is inputted to the reception device 2b via the transmission path 92.

The control unit 30 allocates common wavelengths λ1 to λm (m=n/2) for each of the data signals S #1 to S #n to be precoding pairs, for example. For example, a common wavelength λ1 is allocated to the data signals S #1 and S #2, a common wavelength λ2 is allocated to the data signals S #3 and S #4, and a common wavelength λm is allocated to the data signals S #(n-1) and S #n.

The control unit 30 sets wavelengths to the output ports P1 and P2 so that the data signals S #1 to S #n to be precoding pairs are outputted from the separate output ports P1 and P2 of the multiplexer 32b, respectively. For example, the control unit 30 configures the setting such that one data signal S #1, S #3, . . . , S #(n-1) of each precoding pair is outputted from the output port P1 and the other data signal S #2, S #4, . . . , S #n of each precoding pair is outputted from the output port P2 (see dotted lines).

Therefore, the data signals S #1, S #3, . . . , S #(n-1) are inputted to the multiplexer 32c without being wavelength-converted, and the data signals S #2, S #4, . . . , S #n are wavelength-converted by the wavelength converter 33a and then inputted to the multiplexer 32c. The control unit 30 sets the wavelengths λ1 to λm of the data signals S #1 to S #n at the input ports of the multiplexer 32b.

The wavelength converter 33a converts the wavelengths λ1 to λm into wavelengths λm+1 to λ2m, respectively, as denoted by reference numeral 330. Therefore, the wavelength λ2 of the data signal S #2 is converted into the wavelength λm+1, the wavelength λ2 of the data signal S #4 is converted into the wavelength λm+2, and the wavelength λm of the data signal S #n is converted into the wavelength λ2m. Thus, the number of wavelengths (2m) included in the wavelength multiplexed optical signal Smux is twice the number of wavelengths (m) used by the transmitters 31a to 31f.

Through the wavelength conversion, the data signal S #1 having the wavelength λ1 and the data signal S #2 having the wavelength λ2 form a precoding pair, the data signal S

3 having the wavelength λ2 and the data signal S #4 having the wavelength λ2 form a precoding pair, and the data signal S #(n-1) having the wavelength λm and the data signal S #n having the wavelength λ2m form a precoding pair. For example, precoding pairs are formed between the data signals S #1, S #3, . . . , S #(n-1) not to be subjected to wavelength conversion and the data signals S#2, S #4, . . . , S #n to be subjected to wavelength conversion. Thus, variations in transmission quality may be more effectively reduced.

The control unit 30 allocates wavelengths by setting any of the wavelengths λ1 to λm of the data signals S #1 to S #n for the transmitters 31a to 31f (central wavelength of the transmission light LOs) in the process of Step St5. Since the relationship between the pairs having the wavelengths λ1 to λm before the wavelength conversion by the wavelength converter 33a and the wavelengths λm+1 to λ2m after the wavelength conversion is fixed, any of the wavelengths λ1 to λm may be allocated to the data signals S #1 to S #n to form precoding pairs.

Since the wavelength λ1 is converted into the wavelength λ2, for example, the control unit 30 may allocate the wavelengths λ1 and λ2 to the data signals S #1 and S #2, respectively, by setting the wavelength λ1 to the transmitters 31a and 31b, respectively. In this example, the same wavelengths λ1 to λm are set in the transmitters 31a to 31f of the data signals S #1 to S #n to form precoding pairs; however, different wavelengths λ1 to λm may be set.

The reception device 2b includes demultiplexers 42b and 42c, receivers 41a to 41f, a wavelength converter 43a, and a control unit 40. The wavelength multiplexed optical signal Smux is inputted to the demultiplexer 42c through the transmission path 92.

The demultiplexer 42c is a wavelength selection switch, for example, which separates the data signals S #1 to S #n having the wavelengths λ1 to λ2m from the wavelength multiplexed optical signal Smux, and outputs the signals from one of the output ports P3 and P4 according to the setting from the control unit 40. The data signals S #1 to S #n are inputted from the demultiplexer 42c to the demultiplexer 42b in the subsequent stage. The wavelength converter 43a is coupled between the output port P4 and the demultiplexer 42b.

The demultiplexer 42b outputs the data signals S #1 to S #n to the receivers 41a to 41f, respectively, according to the setting from the control unit 40. The receivers 41a to 41f receive the data signals S #1 to S#n according to the wavelengths λ1 to λm set by the control unit 40.

The control unit 40 sets the demultiplexers 42b and 42c and the receivers 41a to 41f based on the setting information notified from the control unit 30 of the transmitting device 1b. The control unit 40 sets wavelengths to the output ports P3 and P4 so that the data signals S #1, S #3, . . . , S #(n-1) having the wavelengths λ1 to λm are outputted from the output port P3 and the data signals S #2, S #4, . . . , S #n having the wavelengths λm+1 to λ2m are outputted from the output port P4.

The data signals S #2, S #4, . . . , S #n are inputted to the wavelength converter 43a through the output port P4. As denoted by reference numeral 430, the wavelength converter 43a converts the wavelengths λm+1 to λ2m into the wavelengths λ1 to λm, respectively. The wavelength converter 43a has the same configuration as that of the wavelength converters 33 and 43 illustrated in FIG. 12.

The control unit 40 sets wavelengths to the input and output ports of the demultiplexer 42b so that the data signals S #1, S #3, . . . , S #(n-1) having the wavelengths λ1 to λm inputted to the demultiplexer 42b through the output port P3 as inputted to the receivers 41a, 41c, . . . , 41e. The control unit 40 also sets wavelengths to the input and output ports of the demultiplexer 42b so that the data signals S #2, S #4, . . . , S #n having the wavelengths λ1 to λm inputted to the demultiplexer 42b through the output port P4 are inputted to the receivers 41b, 41d, . . . , 41f.

Thus, the data signals S #1 to S #n of the preceding pairs are inputted to the receivers 41a to 41f, respectively, to form decoding pairs. For example, the data signals S #1 and S #2 are inputted to the receivers 41a and 41b, respectively, the data signals S #3 and S #4 are inputted to the receivers 41c and 41d, respectively, and the data signal S #(n-1) and S #n are inputted to the receivers 41e and 41f, respectively.

According to the above configuration, since the wavelength converters 33a and 43a convert the wavelengths λm+1 to λ2m into the wavelengths λ1 to λm, respectively, the number of the wavelength converters 33a and 43a is only one as compared with the case where the wavelength converters 33 and 43 are provided for each of the data signals S #1 to S #n as in the example of FIG. 11, thus reducing the scale of hardware.

(Transmission System Using Spatial Multiplexing Transmission Method)

In the above example, the wavelength multiplexing transmission system using wavelengths as channels has been described as an example; however, variations in transmission quality may also be reduced by channel allocation as described above in a transmission system using a spatial multiplexing transmission method wherein a space inside a transmission path such as a core and a mode of an optical fiber is used as a channel.

Figure 14:
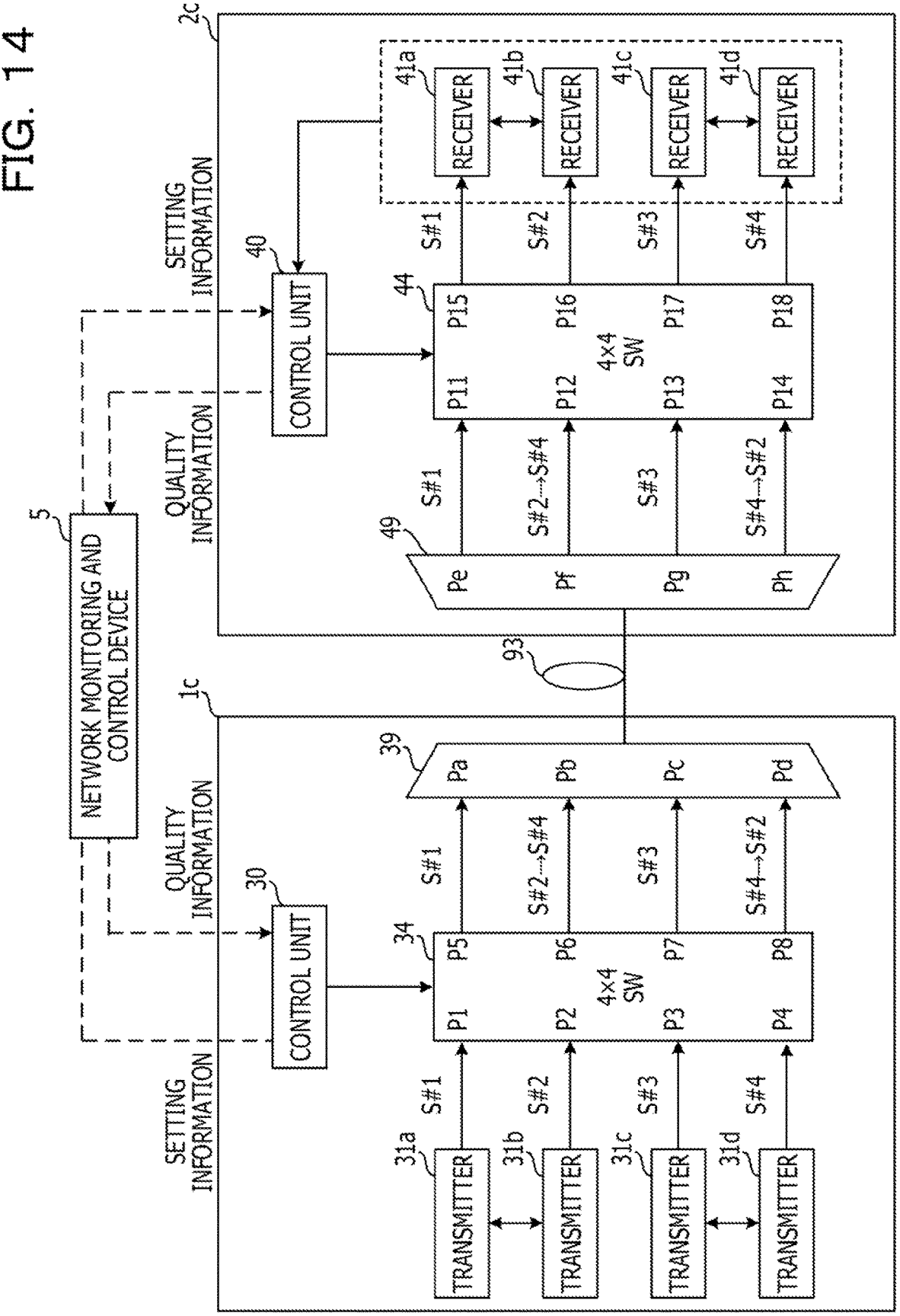
FIG. 14 is a configuration diagram illustrating an example of a transmission system using a spatial multiplexing transmission method.

FIG. 14 is a configuration diagram illustrating an example of a transmission system using a spatial multiplexing transmission method. In FIG. 14, constituents common to those in FIG. 3 are denoted by the same reference numerals, and description thereof is omitted.

A transmitting device 1c and a reception device 2c are coupled by a transmission path 93 including an optical fiber with functions of at least one of a multimode and a multicore. The transmitting device 1c includes transmitters 31a to 31d, an optical switch (4×4 SW) 34, a multiplexer 39, and a control unit 30. The transmitting device 1c is another example of the transmission device.

The transmitters 31a to 31d output data signals S #1 to S #4 to the optical switch 34, respectively. The data signals S #1 to S #4 each have an arbitrary wavelength.

The optical switch 34 has input ports P1 to P4 and output ports P5 to P8. The control unit 30 sets a coupling relationship between the input ports P1 to P4 and the output ports P5 to P8. Therefore, the data signals S #1 to S #4 inputted to the optical switch 34 are outputted to the multiplexer 39 from one of the output ports P5 to P8 according to the setting from the control unit 30. As initial settings, the data signals S #1 to S #4 are outputted, for example, from the output ports P5 to P8.

The multiplexer 39 is a connector for coupling the optical switch 34 to the transmission path 93, and has input ports Pa to Pd to which data signals S #1 to S #4 are inputted from the optical switch 34, respectively. The input ports Pa to Pd are coupled to the output ports P5 to P8 of the optical switch 34, respectively.

The input ports Pa to Pd are coupled to different spaces in the transmission path 93. When the optical fiber of the transmission path 93 is multicore, the data signals S #1 to S #4 are inputted to different cores through the input ports Pa to Pd; on the other hand, when the optical fiber of the transmission path 93 is multimode, the data signal S #1 to S #4 are inputted to propagation paths of different modes through the input ports Pa to Pd. When the optical fiber of the transmission path 93 is multicore and multimode, the data signals S #1 to S #4 are inputted to combinations of propagation paths of different cores and modes through the input ports Pa to Pd.

Therefore, the data signals S #1 to S #4 are spatially multiplexed by being inputted to the transmission path 93 from the multiplexer 39. The optical switch 34 is an example of a switch unit that switches a space in the transmission path 93 through which the data signals S #1 to S #4 are transmitted. The data signals S #1 to S #4 are inputted to the reception device 2c through the transmission path 93.

The reception device 2c includes receivers 41a to 41d, an optical switch (4×4 SW) 44, a separator 49, and a control unit 40. The separator 49 is a connector that couples the optical switch 44 to the transmission path 93, and outputs the data signals S #1 to S #4 inputted from the transmission path 93 to the optical switch 44 through the output ports Pe to Ph, respectively. The output ports Pe to Ph are coupled to the input ports Pa to Pd of the multiplexer 39 via the transmission path 93, respectively.

The optical switch 44 has input ports P11 to P14 and output ports P15 to P18. The input ports P11 to P14 are coupled to the output ports Pe to Ph of the separator 49, respectively, while the output ports P15 to P16 are coupled to the receivers 41a to 41d respectively.

The control unit 40 sets a link relationship between the input ports P11 to P14 and the output ports P15 to P18 so that the data signals S #1 to S #4 are inputted to the receivers 41a to 41d, respectively. The control unit 40 sets the optical switch 44 according to the setting information indicating the setting of the optical switch 34 of the transmitting device 1c. The control unit 40 acquires SNRs of the data signals S #1 to S #4, for example, from the receivers 41a to 41d, and transmits the SNRs as quality information to the control unit 30 of the transmitting device 1c via the network monitoring and control device 5.

The channel allocation unit 102 of the control unit 30 controls the optical switch 44 based on the SNR indicated by the quality information, thereby allocating the space in the transmission path 93 to the data signals S #1 to S #4, respectively. As in the example of FIG. 1, for example, when the SNRs of the data signals S #1 and S #2 of the precoding pair are higher than the SNRs of the data signals S #3 and S #4 of the other precoding pair, the channel allocation unit 102 changes the output port P6 of the data signal S #2 to the output port P8 and changes the output port. P8 of the data signal S #4 to the output port P6.

For example, the channel allocation unit 102 configures the setting to couple the input port P2 to the output port P8 and couple the input port P4 to the output port P6. Thus, the input port Pb of the multiplexer 39 to which the data signal S #2 is inputted becomes the input port Pd, while the input port Pd of the multiplexer 39 to which the data signal S #4 is inputted becomes the input port Pb.

The control unit 30 notifies the reception device 2c of setting information indicating the settings of the output ports P5 to P8 of the data signals S #1 to S #4 to the reception device 2c via the network monitoring and control device 5. The control unit 40 of the reception device 2c sets the optical switch 44 so that the data signals S #1 to S #4 are outputted from the output ports P15 to P18 according to the setting information.

For example, the control unit 40 configures the setting to couple the input port P12 to the output port P18 and couple the input port P14 to the output port P16. Therefore, the data signal S #4 outputted from the output port Pf of the separator 49 is inputted to the receiver 41d from the output port P18, and the data signal S #2 outputted from the output port Ph of the separator 49 is inputted to the receiver 41b from the output port P16.

Thus, the space in the transmission path 93 through which the data signals S #2 and S #4 are transmitted is changed without changing the precoding and decoding pairs of the data signals S #1 to S #4. Therefore, since the transmission characteristics of the data signals S #2 and S #4 are changed according to the space in the transmission path 93, the difference in SNR between the data signals S #1 and S #2 and the data signals S #3 and S #4 may be reduced.

The control unit 30 allocates the space in the transmission path 93 as a channel to the data signals S #1 to S #4 by the processing illustrated in FIG. 7 or 9. An example of allocation processing will be described below.

FIG. 15 is a diagram illustrating another example of channel allocation processing. Reference numeral Ge denotes a channel setting table 130 before channel allocation, while reference numeral Gf denotes a channel setting table 130 after channel allocation.

In the channel setting table 130, port IDs indicating the output ports P5 to P8 of the optical switch 34 are registered instead of the wavelengths in the channel setting table 130 illustrated in FIG. 8. The channel allocation unit 102 couples the input ports P1 to P4 and the output ports P5 to P8 of the optical switch 34 so that the data signals S #1 to S #4 are outputted from the output ports P5 to P8 corresponding to the port IDs. In this example, the upper limit of the precoding frequency for each of the transmitters 31a to 31d is 1.

Prior to the allocation process, the output ports P5 to P8 are set to correspond to the data signals S #1 to S #4 as initial settings. The SNRs of the data signals S #1 to S #4 indicate values when precoding is not performed. The SNRs of the data signals S #1 and S #2 are higher than the SNRs of the data signals S #3 and S #4, the SNR varies significantly across the data signals S #1 to S #4.

The channel allocation unit 102 selects a channel #1 (CH-ID #1) of the output port P5 with the maximum SNR (14 (dB)) and a channel #4 (CH-ID #4) of the output port P8 with the minimum SNR (5.4 (dB)). The channel allocation unit 102 allocates the output ports P5 and P8 corresponding to the channels #1 and #4 to the data signals S #1 and S #2 of the precoding pair, respectively.

Thus, the space in the transmission path 93 to which the output ports P5 and P8 are coupled is allocated to the data signals S #1 and S #2. Since the precoding frequency has reached the upper limit, the channels #1 and #4 are excluded from the channel candidates.

Next, the channel allocation unit 102 selects a channel #2 (CH-ID #2) of the output port P7 having the second largest SNR (11.2 (dB)) and a channel #3 (CH-ID #3) of the output port P6 having the second smallest SNR (6.9 (dB)). The channel allocation unit 102 allocates the output ports P6 and P7 corresponding to the channels #3 and #2 to the data signals S #3 and S #4 of the precoding pair, respectively.

Thus, the space in the transmission path 93 to which the output ports P6 and P7 are coupled is allocated to the data signals S #3 and S #4. Since the precoding frequency has reached the upper limit, the channels #3 and #4 are excluded from the channel candidates. Since there are no other channel candidates left, the channel allocation unit 102 terminates the allocation processing.

After the allocation processing, the SNRs of the precoded data signals S #1 and S #2 with the output ports P5 and P8 allocated thereto, respectively, are both 7.4 (dB), and the SNRs of the precoded data signals S #3 and S #4 with the output ports P7 and P6 allocated thereto, respectively, are both 6.4 (dB). Therefore, as compared with the SNRs before the allocation processing, the SNR variation is reduced across the data signals S #1 to S #4.

Thus, the channel allocation unit 102 allocates the space in the transmission path 93 as channels to the data signals S #1 to S #4 by controlling the optical switch 34 so that the difference in transmission quality between the data signals S #1 and S #2 and the data signals S #3 and S #4 is reduced. Thus, variations in transmission quality across the data signals S #1 to S #4 dependent on the space in the transmission path 93 are reduced.

(Transmission System Using Wavelength Multiplexing Transmission Method and Spatial Multiplexing Transmission Method)

In a transmission system using a wavelength multiplexing transmission method and a spatial multiplexing transmission method (hereinafter referred to as "wavelength/spatial multiplexing transmission method"), again, variations in transmission quality may be reduced by allocating wavelengths and a space in the transmission path 93 as channels to data signals.

Figure 16:
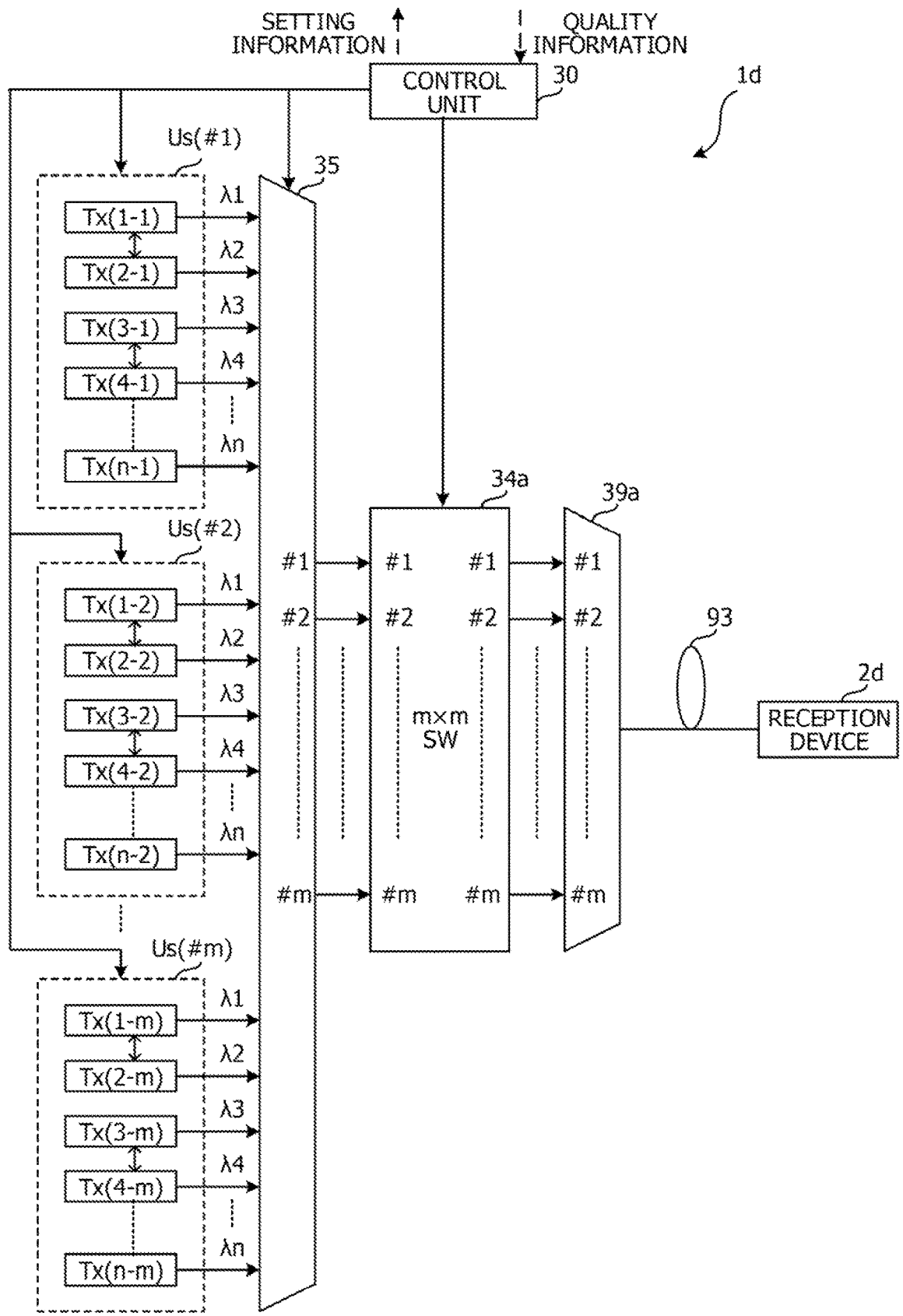
FIG. 16 is a configuration diagram illustrating an example of a transmitting device in a transmission system using a wavelength multiplexing transmission method and a spatial multiplexing transmission method.

FIG. 16 is a configuration diagram illustrating an example of a transmitting device 1d in a transmission system using a wavelength/spatial multiplexing transmission method. The transmitting device 1d is another example of a transmission device, which includes transmission units Us (#1 to #m (m: positive integer)), a multiplexer 35, an optical switch (m×m SW) 34a, a multiplexer 39a, and a control unit 30.

Each transmission unit Us includes n transmitters Tx(1-x) to Tx(n-x) (x: 1, 2, . . . , m). The transmitters Tx(1-x) to Tx(n-x) transmit data signals having wavelengths $\lambda 1$ to $\lambda n$. The data signals having the wavelengths $\lambda 1$ to $\lambda n$ are inputted to separate spaces in the transmission path 93 for each transmission unit Us.

The transmitters Tx(1-x) to Tx(n-x) have the same configuration as that of the transmitters 31a to 31d illustrated in FIGS. 4A and 4B. A pair of transmitters Tx(1-x) and Tx(2-x), a pair of transmitters Tx(3-x) and Tx(4-x), a pair of transmitters Tx(n-1-x) and Tx(n-x) each transmit data signals as a preceding pair. For each transmission unit Us, the wavelengths $\lambda 1$ to $\lambda n$ are allocated to the data signals of the transmitters Tx(1-x) to Tx(n-x). Each data signal is inputted to the multiplexer 35.

The multiplexer 35 is a wavelength selection switch, for example, which wavelength-multiplexes the data signal by the transmission unit Us and outputs the data signal to one of the input ports #1 to #m of the optical switch 34a. For example, the multiplexer 35 wavelength-multiplexes the data signals of the transmitters Tx(1-1) to Tx(n-1) of the transmission unit Us (#1), wavelength-multiplexes the data signals of the transmitters Tx(1-2) to Tx(n-2) of the transmission unit Us (#2), and wavelength-multiplexes the data signals of the transmitters Tx(1-m) to Tx(n-m) of the transmission unit Us (#m). The multiplexer 35 outputs the wavelength multiplexed optical signal of each transmission unit Us to the optical switch 34a from one of the output ports #1 to #m according to the setting from the control unit 30.

The optical switch 34a has input ports #1 to #m and output ports #1 to #m. The wavelength multiplexed optical signals are inputted to the input ports #1 to #m of the optical switch 34a from the output ports #1 to #m of the multiplexer 35.

The optical switch 34a couples the input ports #1 to #m to the output ports #1 to #m according to the setting from the control unit 30. Each wavelength multiplexed optical signal is inputted to the multiplexer 39a from one of the output ports #1 to #m of the optical switch 34a. The optical switch 34a is an example of a switch unit.

The multiplexer 39a has the same function as that of the multiplexer 39 in the above example. The multiplexer 39a has input ports #1 to #m coupled to the space in the transmission path 93. The wavelength multiplexed optical signals are inputted to the output ports #1 to #m of the multiplexer 39a from the output ports #1 to #m of the optical switch 34a. The wavelength multiplexed optical signal are spatially multiplexed by being inputted to the space in the transmission path 93 corresponding to the input ports #1 to #m of the multiplexer 39a.

Thus, the data signals are subjected to wavelength multiplexing and spatial multiplexing and then inputted to the transmission path 93. The transmission path 93 includes an optical fiber having m pairs of modes and cores. When the optical fiber includes Ma modes and Mb cores, for example, m is the product (Ma×Mb) of Ma and Mb.

The channel allocation unit 102 of the control unit 30 sets the wavelengths $\lambda 1$ to $\lambda n$ (center wavelength of transmission light LOs) so that the difference in transmission quality between the data signals that form a precoding pair for the transmitters Tx(1-1) to Tx(n-1) of each transmission unit Us. Thus, one of the wavelengths $\lambda 1$ to $\lambda n$ is allocated to the data signal of each transmission unit Us. The channel allocation unit 102 sets the output ports #1 to #m of the multiplexer 35 so that the wavelength multiplexed optical signals of the transmission units Us (#1 to #m) are outputted from the output ports #1 to #m of the multiplexer 35, respectively.

The channel allocation unit 102 sets the link between the input ports #1 to #m and the output ports #1 to #m so that the difference in transmission quality between the data signals that form the precoding pair of each transmission unit Us is reduced for the optical switch 34a. Thus, the space in the transmission path 93 is allocated to the wavelength multiplexed optical signal of each transmission unit Us.

The control unit 30 notifies the reception device 2d of the setting of the wavelengths of the transmitters Tx(1-1) to Tx(n-1), the setting of the output ports #1 to #m of the multiplexer 35, and the link settings of the input ports #1 to #m and the output ports #1 to #m of the optical switch 34a as setting information.

Figure 17:
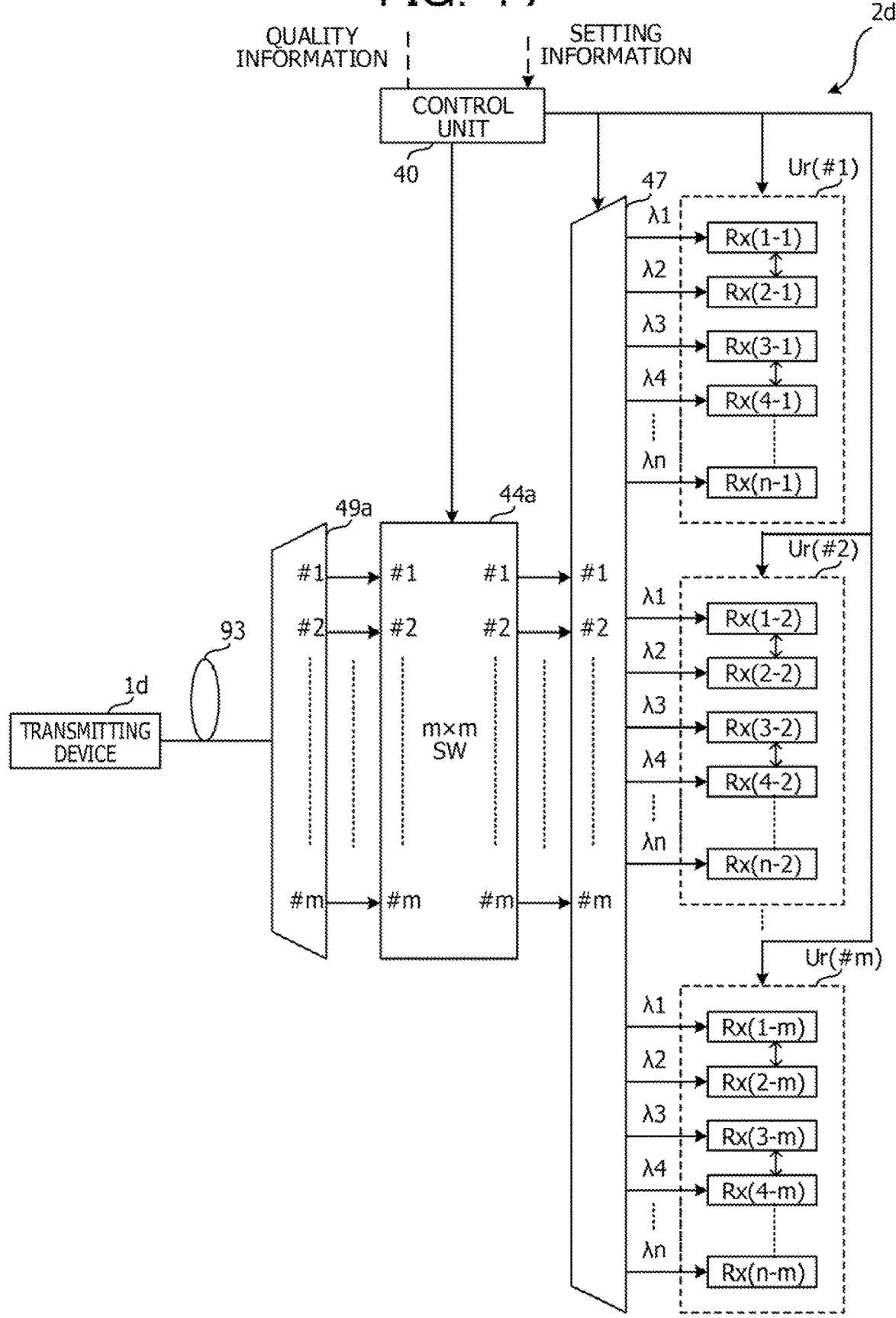
FIG. 17 is a configuration diagram illustrating an example of a reception device in the transmission system using the wavelength multiplexing transmission method and the spatial multiplexing transmission method.

FIG. 17 is a configuration diagram illustrating an example of a reception device 2d in the transmission system using the wavelength/spatial multiplexing transmission method. The reception device 2d includes reception units Ur (#1 to #m), a separator 49a, an optical switch (m×m SW) 44a, a demultiplexer 47, and a control unit 40. The wavelength multiplexed optical signal from each transmission unit Us is inputted to the separator 49a through the transmission path 93.

The separator 49a has the same function as that of the separator 49 in the above example. The separator 49a has output ports #1 to #m coupled to the space in the transmission path 93. The separator 49a outputs each wavelength multiplexed optical signal to the optical switch 44a from the output ports #1 to #m.

The optical switch 44a has input ports #1 to #m and output ports #1 to #m. The wavelength multiplexed optical signals are inputted to the input ports #1 to #m of the optical switch 44a from the output ports #1 to #m of the separator 49a.

The optical switch 44a couples the input ports #1 to #m to the output ports #1 to #m according to the setting from the control unit 40. Each wavelength multiplexed optical signal is inputted to the demultiplexer 47 from one of the output ports #1 to #m of the optical switch 44a.

The demultiplexer 47 is a wavelength selection switch, for example, having input ports #1 to #m coupled to the output ports #1 to #m of the optical switch 44a. The demultiplexer 47 separates each wavelength multiplexed optical signal into data signals having the wavelengths λ1 to λn, and outputs the data signals to each reception unit Ur according to the setting from the control unit 40.

Each reception unit Ur includes n receivers Rx(1-x) to Rx(n-x). The receivers Rx(1-x) to Rx(n-x) receive the data signals having the wavelengths λ1 to λn.

The receivers Rx(1-x) to Rx(n-x) have the same configuration as that of the receivers 41a to 41d illustrated in FIGS. 5A and 5B. A pair of receivers Rx(1-x) and Rx(2-x), a pair of receivers Rx(3-x) and Rx(4-x), a pair of receivers Rx(n-1-x) and Rx(n-x) each receive data signals as a decoding pair. For each reception unit Ur, the wavelengths λ1 to λn are allocated to the data signals of the receivers Rx(1-x) to Rx(n-x).

The control unit 40 sets link between the input ports #1 to #m and the output ports #1 to #m of the optical switch 44a, the wavelengths λ1 to λm of the input ports #1 to #m of the demultiplexer 47, and the wavelengths λ1 to λm of the receivers Rx(1-x) to Rx(n-x) of each reception unit Ur according to the setting information notified from the control unit 30 of the transmitting device 1d. Thus, the receivers Rx(1-x) to Rx(n-x) of each reception unit Ur may normally receive the data signal according to the channel allocation in the transmitting device 1d.

According to the above configuration, the channel allocation unit 102 may reduce variations in transmission loss for each channel by allocating the wavelength and the space in the transmission path 93 to the data signal as a channel based on the quality information of the transmission quality.

(First Modified Example of Transmitting Device 1d)

In the above example, the transmitting device 1d selects a space in the transmission path 93 for each wavelength multiplexed optical signal by one optical switch 34a; however, when there are many ports (m×m), there is a risk that the optical insertion loss may be increased or the size may be increased. Therefore, a plurality of optical switches may be used as in the following example.

Figure 18:
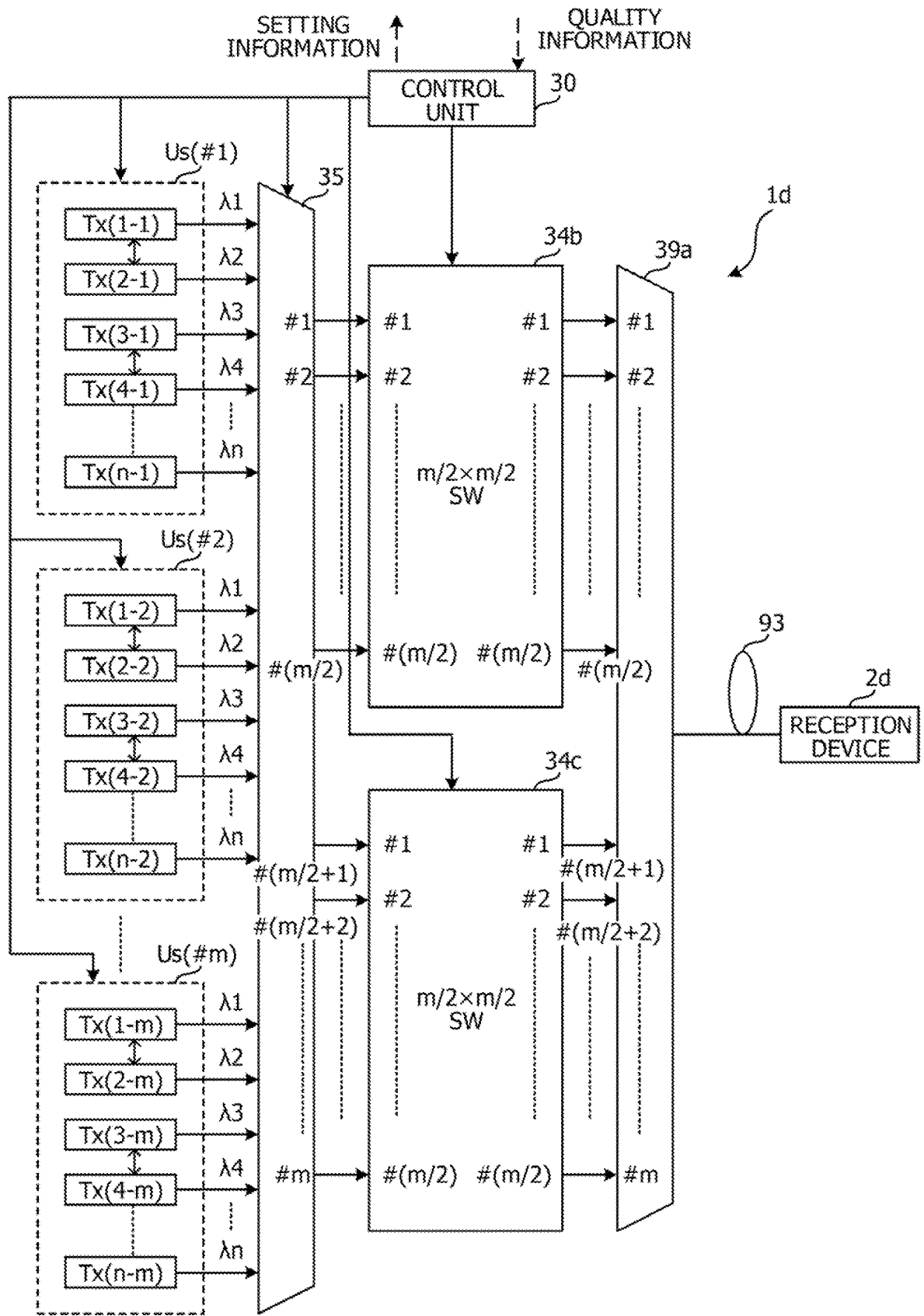
FIG. 18 is a configuration diagram illustrating a first modified example of the transmitting device.

FIG. 18 is a configuration diagram illustrating a first modified example of the transmitting device 1d. In FIG. 18, constituents common to those in FIG. 16 are denoted by the same reference numerals, and description thereof is omitted.

The transmitting device 1d of this example includes two optical switches (m/2×m/2 SW) 34b and 34c instead of the optical switch 34a. The optical switches 34b and 34c each has input ports #1 to #(2/m) and output ports #1 to #(m/2). It is assumed that m is a multiple of 2.

The input ports #1 to #(2/m) of the optical switch 34b are coupled to the output ports #1 to #(m/2) of the multiplexer 35, respectively, while the output ports #1 to #(2/m) of the optical switch 34b are coupled to the input ports #1 to #(m/2) of the multiplexer 39a, respectively. The input ports #1 to #(2/m) of the optical switch 34c are coupled to the output ports #1 to #(m/2+1) of the multiplexer 35, respectively, while the output ports #1 to #(2/m) of the optical switch 34b are coupled to the input ports #(j/2+1) to #m of the multiplexer 39a, respectively.

Therefore, as in the case of the optical switch 34a in the above example, the optical switches 34b and 34c may input the wavelength multiplexed optical signal of each transmission unit Us to one of the input ports #1 to #m of the multiplexer 39a according to the setting from the control unit 30.

According to this configuration, since the number of the ports of each of the optical switches 34b and 34c is smaller than that of the optical switch 34a in the above example, a risk may be reduced that the optical insertion loss of each of the optical switches 34b and 34c may be increased or the size thereof may be increased. In the reception device 2d, two optical switches with fewer ports may be provided instead of the single optical switch 44a according to the transmitting device 1d of this example.

(Second Modified Example of Transmitting Device 1d)

In the above example, the transmitting device 1d generates a wavelength multiplexed optical signal by wavelength multiplexing the data signal for each transmission unit Us by one multiplexer 35; however the data signal may be wavelength multiplexed by the multiplexer for each transmission unit Us. In the above example, the optical switches 34a to 34c are used; however, a wavelength selection switch may be used instead of the optical switch 34a.

Figure 19:
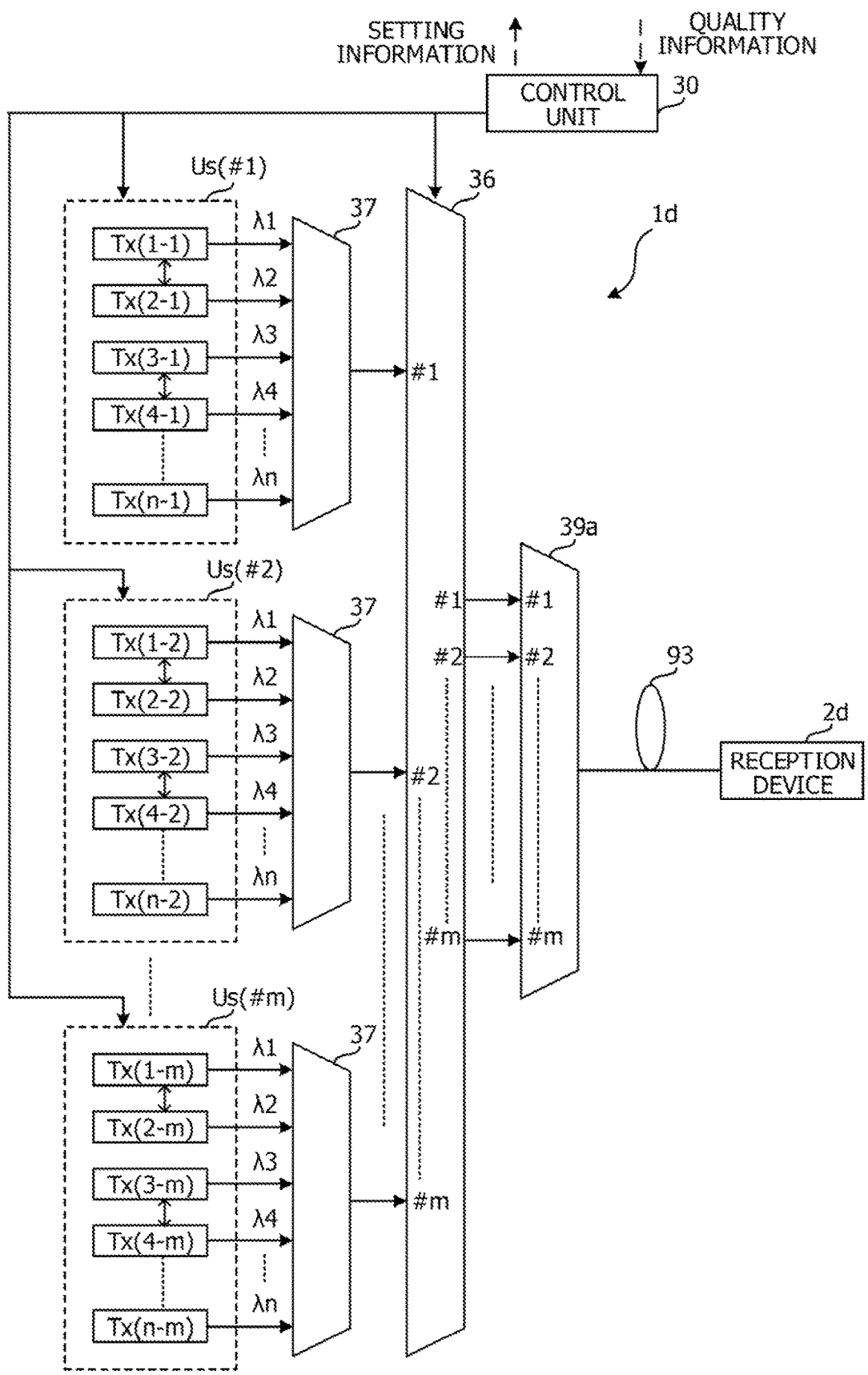
FIG. 19 is a configuration diagram illustrating a second modified example of the transmitting device.

FIG. 19 is a configuration diagram illustrating a second modified example of the transmitting device 1d. In FIG. 19, constituents common to those in FIG. 16 are denoted by the same reference numerals, and description thereof is omitted.

The transmitting device 1d of this example includes m multiplexers 37 instead of the multiplexer 35, and includes a wavelength selection switch 36 instead of the optical switch 34a. The wavelength selection switch 36 has input ports #1 to #m and output ports #1 to #m.

The multiplexer 37 is an optical coupler, for example, which is provided corresponding to each transmission unit Us. The multiplexer 37 generates a wavelength multiplexed optical signal by multiplexing the data signals having wavelengths λ1 to λn and outputs the signal to the wavelength selection switch 36. Therefore, the m multiplexers 37 have the same function as that of the multiplexer 35 in the above example. The multiplexer 37 may be a wavelength selection switch.

The wavelength selection switch 36 has input ports #1 to #m and output ports #1 to #m. The input ports #1 to #m of the wavelength selection switch 36 are each coupled to the multiplexer 37 corresponding to each transmission unit Us. The output ports #1 to #m of the wavelength selection switch 36 are coupled to the input ports #1 to #m of the multiplexer 39a. Therefore, the wavelength selection switch 36 has the same functions as those of the optical switch 34a and the two optical switches 34b and 34c in the above example.

According to the configuration of this example, the optical switches 34a to 34c may be omitted from the transmitting device 1d, and the multiplexer 37 having fewer ports than the multiplexer 35 may be used. In the reception device 2d, the wavelength selection switch may be provided instead of the optical switch 44a and the demultiplexer may be provided for each reception unit Ur instead of the demultiplexer 47 according to the transmitting device 1d of this example.

(Channel Allocation by Network Monitoring and Control Device 5)

In the examples described above, the control units 30 of the transmitting devices 1 and 1a to 1d allocate channels to the data signals S #1 to S #n; however, the network monitoring and control device 5 may allocate channels instead of the control units 30. In this case, the control unit 30 performs setting of the central wavelength of the transmission light LOs in accordance with an instruction from the network monitoring and control device 5. The control unit 40 of the reception device 2d also performs setting of the central wavelength of the local light LOr in accordance with an instruction of the network monitoring and control device 5.

Figure 20:
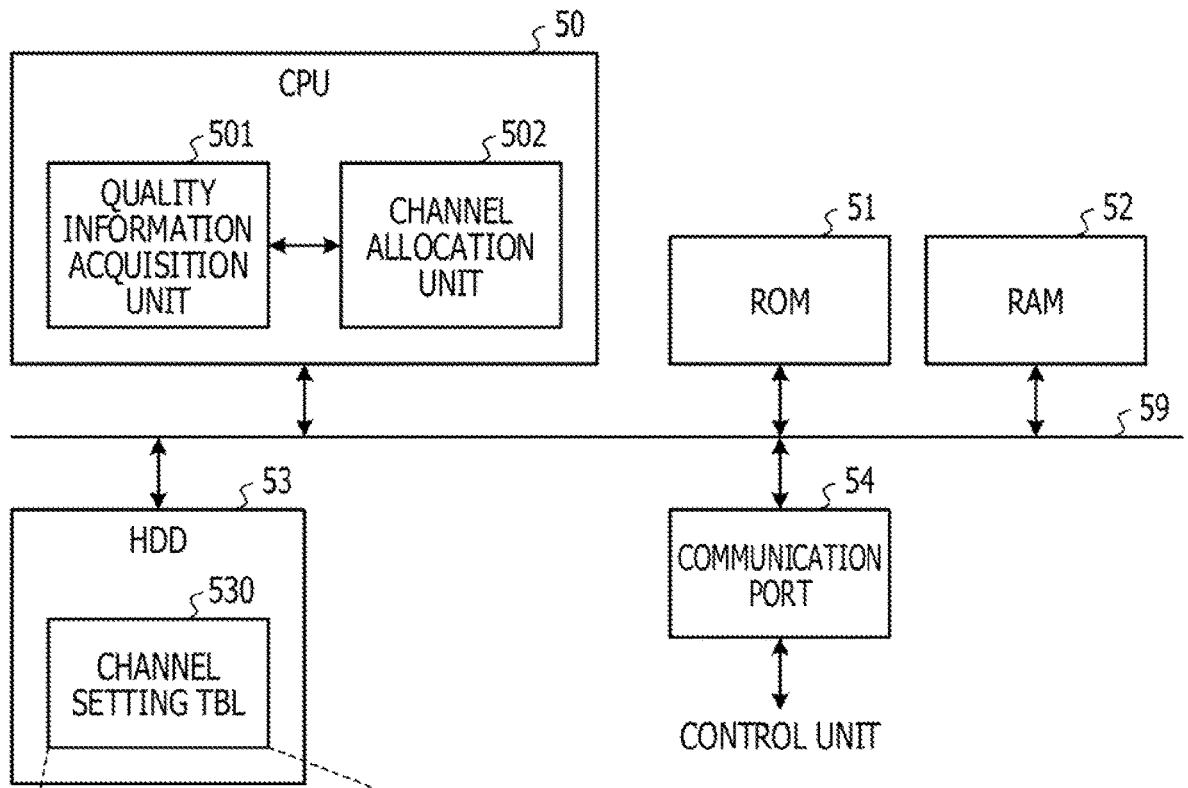
FIG. 20 is a configuration diagram illustrating an example of a network monitoring and control device.

FIG. 20 is a configuration diagram illustrating an example of the network monitoring and control device 5. The network monitoring and control device 5 includes a CPU 50, a ROM 51, a RAM 52, a hard disk drive (HDD) 53, and a communication port 54. The CPU 50 is coupled to the ROM 51, the RAM 52, the HDD 53, and the communication port 54 via a bus 59 so as to enable mutual inputting/outputting of signals. The network monitoring and control device 5 may have another storage device such as a memory instead of the HDD 53.

The ROM 51 stores a program for driving the CPU 50. The RAM 52 functions as a working memory for the CPU 50. The communication port 54 is a LAN port, for example, for processing communications between the control units 30 and 40 and the CPU 50.

When the CPU 50 reads the program from the ROM 51, a quality information acquisition unit 501 and a channel allocation unit 502 are formed as functions. The storage memory 13 stores a channel setting table (TBL) 530.

The quality information acquisition unit 501 is an example of an acquisition unit, which acquires SNRs of the data signals S #1 to S #n from the reception devices 2 and 2a to 2d through the communication port 14 in accordance with instructions from the channel allocation unit 502. The channel allocation unit 502 is an example of an allocation unit, which allocates at least one of the wavelengths λ1 to λn and the space in the transmission path 93 as a channel to the data signals S #1 to S #n based on quality information such as the SNR or margin so that a difference in transmission quality between the respective precoding pairs including the data signals S #1 to S #n is reduced.

The channel allocation processing executed by the network monitoring and control device 5 is the same as that illustrated in FIG. 7 or 9 described above. The processing illustrated in FIGS. 7 and 9 is an example of the transmission method of the embodiment.

As described above, the channel allocation units 102 and 502 allocate the channels to the data signals S #1 to S #4 based on the index value of transmission quality so that the difference in transmission quality between the precoding pairs including the data signals S #1 to S #n is reduced. Thus, variations in transmission quality of the data signals S #1 to S #n to be multiplexed and transmitted are reduced. In this event, since the data signals S #1 to S #n themselves that forms precoding pairs are not changed, the possibility of an increase in the scale of hardware such as a DSP or a complicated configuration, for example, is reduced.

In the above example, the case where at least one of the wavelength and the space in the transmission path 93 is allocated to the data signals S #1 to S #4 as a channel has been described; however, the present disclosure is not limited thereto, and examples of the channel include polarization, I components, and Q components of the data signals S #1 to S #4. In the above example, the precoding pair includes two data signals S #1 and S #n, but is not limited thereto and may include three or more data signals S #1 to S #n.

The above-described embodiment is a preferred embodiment of the present disclosure. However, the embodiment is not limited to this, and various modifications may be made without departing from the scope of the disclosure.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A transmission device that transmits an optical signal, comprising:
a first signal processing circuit configured to average transmission quality of a first data signal based on a third data signal;
a second signal processing circuit configured to average transmission quality of a second data signal based on a fourth data signal; and
a processor configured to allocate a channel in a transmission path that transmits the first data signal and a channel in a transmission path that transmits the second data signal, based on a first index value indicating transmission quality of a first optical signal in the transmission path through which the first optical signal is transmitted, the first optical signal being generated based on the averaged first data signal and a second index value indicating transmission quality of a second optical signal in the transmission path through which the second optical signal is transmitted, the second optical signal being generated based on the averaged second data signal.

2. The transmission device according to claim 1, wherein the processor allocates the channel in the transmission path that transmits the first data signal and the channel in the transmission path that transmits the second data signal, based on the first index value and the second index value, so that a difference in transmission quality between the first and second optical signals is reduced.

3. The transmission device according to claim 1, further comprising:
a first optical modulator configured to generate the first optical signal having a predetermined wavelength, based on the first data signal outputted from the first signal processing circuit; and
a second optical modulator configured to generate the second optical signal having a predetermined wavelength, based on the second data signal outputted from the first signal processing circuit, wherein
the processor allocates a wavelength for transmitting the first data signal and a wavelength for transmitting the second data signal,
the first optical modulator generates the first optical signal having the wavelength allocated to the first data signal, and
the second optical modulator generates the second optical signal having the wavelength allocated to the second data signal.

4. The transmission device according to claim 1, further comprising:
the transmission path is a multicore fiber having a plurality of cores,
the transmission device further comprising a switch configured to switch between a core for transmitting the first optical signal and a core for transmitting the second optical signal,
the processor allocates a core for transmitting the first data signal and a core for transmitting the second data signal, and the switch outputs the first and second optical signals to the allocated cores, respectively.

5. The transmission device according to claim 1, further comprising:
the transmission path is a multimode fiber for transmitting in a plurality of propagation modes,
the transmission device further comprises a switch configured to switch between a propagation mode for transmitting the first optical signal inputted to a first port and a propagation mode for transmitting the second optical signal,
the processor allocates a propagation mode for transmitting the first data signal and a propagation mode for transmitting the second data signal, and
the switch outputs the first and second optical signals so that the optical signals are propagated in the allocated propagation modes, respectively.

6. The transmission device according to claim 1, further comprising:
the processor acquires the index value from a reception device that receives the first optical signal and the second optical signal, respectively.

7. The transmission device according to claim 1, further comprising:
the first signal processing circuit unitary transforms the third data signal and the first data signal, and
the first signal processing circuit unitary transforms the fourth data signal and the second data signal.

8. The transmission device according to claim 1, further comprising:
the processor performs a process of
allocating the channel in the transmission path that transmits the first data signal and the channel in the transmission path that transmits the second data signal, based on the first index value and the second index value when the transmission quality is not averaged by the first signal processing circuit and the second signal processing circuit, and
changing the channel in the transmission path that transmits the first data signal and the channel in the transmission path that transmits the second data signal, based on the first index value and the second index value when the transmission quality is averaged by the first signal processing circuit and the second signal processing circuit.

9. The transmission device according to claim 8, wherein
the processor increases the averaging frequency of the first signal processing circuit when the first index value does not meet a predetermined standard.

10. The transmission device according to claim 9, wherein
the processor changes the channel to be allocated to the first optical signal when the first index value when the transmission quality is averaged by the first signal processing circuit does not meet the predetermined standard and the frequency of averaging the transmission quality of the optical signal has reached its upper limit.

11. A control device that controls a transmission device including a first signal processing circuit for averaging transmission quality of a first data signal based on a third data signal and a second signal processing circuit for averaging transmission quality of a second data signal based on a fourth data signal, comprising:
a memory; and
a processor configured to allocate a channel in a transmission path that transmits the first data signal and a channel in a transmission path that transmits the second data signal, based on a first index value indicating transmission quality of a first optical signal in the transmission path through which the first optical signal is transmitted, the first optical signal being generated based on the averaged first data signal and a second index value indicating transmission quality of a second optical signal in the transmission path through which the second optical signal is transmitted, the second optical signal being generated based on the averaged second data signal.

12. The control device according to claim 11, wherein
the processor allocates the channel in the transmission path that transmits the first data signal and the channel in the transmission path that transmits the second data signal, based on the first index value and the second index value, so that a difference in transmission quality between the first and second optical signals is reduced.

13. A transmission method for transmitting an optical signal, comprising:
averaging transmission quality of a first data signal based on a third data signal;
averaging transmission quality of a second data signal based on a fourth data signal; and
allocating a channel in a transmission path that transmits the first data signal and a channel in a transmission path that transmits the second data signal, based on a first index value indicating transmission quality of a first optical signal in the transmission path through which the first optical signal is transmitted, the first optical signal being generated based on the averaged first data signal and a second index value indicating transmission quality of a second optical signal in the transmission path through which the second optical signal is transmitted, the second optical signal being generated based on the averaged second data signal.

14. The transmission method according to claim 13, wherein
the allocating a channel includes
allocating the channel in the transmission path that transmits the first data signal and the channel in the transmission path that transmits the second data signal, based on the first index value and the second index value, so that a difference in transmission quality between the first and second optical signals is reduced.

* * * * *